(12) United States Patent
Nakayama et al.

(10) Patent No.: US 11,609,635 B2
(45) Date of Patent: Mar. 21, 2023

(54) ENVIRONMENTAL CONDITION STORAGE DEVICE, ENVIRONMENTAL CONDITION STORAGE METHOD, OPERATION DEVICE, AND ENVIRONMENT RECOGNITION DEVICE

(71) Applicant: DAIKIN INDUSTRIES, LTD., Osaka (JP)

(72) Inventors: Naoko Nakayama, Osaka (JP); Sanae Kagawa, Osaka (JP); Kazuyuki Satou, Osaka (JP); Ryuta Ueda, Tokyo (JP); Hideyuki Takahashi, Osaka (JP); Hiroshi Ishiguro, Suita (JP); Midori Takama, Suita (JP); Yuichiro Yoshikawa, Suita (JP); Yutaka Nakamura, Suita (JP); Hisashi Ishihara, Suita (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/420,947

(22) PCT Filed: Jan. 10, 2020

(86) PCT No.: PCT/JP2020/000662
§ 371 (c)(1),
(2) Date: Jul. 6, 2021

(87) PCT Pub. No.: WO2020/145386
PCT Pub. Date: Jul. 16, 2020

(65) Prior Publication Data
US 2022/0066561 A1 Mar. 3, 2022

(30) Foreign Application Priority Data
Jan. 11, 2019 (JP) .............................. JP2019-003124
Nov. 15, 2019 (JP) .............................. JP2019-207484

(51) Int. Cl.
*G06F 3/01* (2006.01)
*G06F 16/906* (2019.01)

(52) U.S. Cl.
CPC .............. *G06F 3/016* (2013.01); *G06F 3/011* (2013.01); *G06F 16/906* (2019.01)

(58) Field of Classification Search
CPC ......... G06F 3/016; G06F 3/011; G06F 16/906
See application file for complete search history.

(56) References Cited

U.S. PATENT DOCUMENTS

| 2014/0210800 | A1* | 7/2014 | Takimoto | ................ G06F 16/58 345/204 |
| 2015/0220199 | A1* | 8/2015 | Wang | ..................... G06F 3/016 345/173 |
| 2019/0064927 | A1* | 2/2019 | Tachi | ..................... B25J 13/025 |

FOREIGN PATENT DOCUMENTS

JP  2003-299013 A  10/2003

OTHER PUBLICATIONS

International Search Report of corresponding PCT Application No. PCT/JP2020/000662 dated Mar. 24, 2020.

(Continued)

*Primary Examiner* — Cao H Nguyen
(74) *Attorney, Agent, or Firm* — Global IP Counselors, LLP

(57) ABSTRACT

An environmental condition storage device is usable to store an environmental condition. The environmental condition storage device includes an environmental condition acquisition unit, a tactile information acquisition unit, and a storage unite. The environmental condition acquisition unit acquires an environmental condition including at least one of a temperature, humidity, wind, a picture, an image, and a sound. The tactile information acquisition unit acquires tactile information indicating a tactile sensation. The storage (Continued)

unit stores the environmental condition and the tactile information in association with each other.

24 Claims, 17 Drawing Sheets

(56) References Cited

OTHER PUBLICATIONS

International Preliminary Report of corresponding PCT Application No. PCT/JP2020/000662 dated Jul. 22, 2021.

* cited by examiner

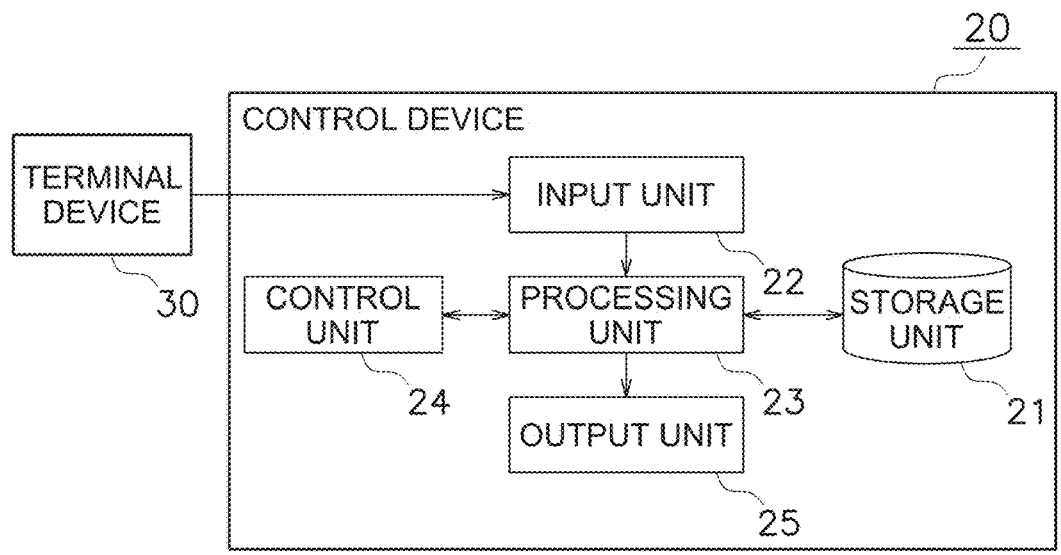

FIG. 2

| NUMBER OF CLUSTER | FEATURE OF CLUSTER (SPECIFIC INFLUENCE) | ENVIRONMENTAL CONDITION | | | | |
|---|---|---|---|---|---|---|
| | | NUMBER OF ENVIRONMENTAL CONDITION | TEMPERATURE | HUMIDITY | SOUND | PICTURE |
| CLUSTER 1 | ENJOYABLE ENVIRONMENT | ENVIRONMENTAL CONDITION 1 | TEMPERATURE 1 | HUMIDITY 1 | SOUND 1 | PICTURE 1 |
| | | ENVIRONMENTAL CONDITION 2 | TEMPERATURE 2 | HUMIDITY 1 | SOUND 2 | PICTURE 1 |
| | | ENVIRONMENTAL CONDITION 3 | TEMPERATURE 1 | HUMIDITY 1 | SOUND 2 | PICTURE 1 |
| CLUSTER 2 | ENVIRONMENT THAT ENHANCES CONCENTRATION | ENVIRONMENTAL CONDITION 4 | TEMPERATURE 3 | HUMIDITY 1 | --- | PICTURE 2 |
| | | ENVIRONMENTAL CONDITION 5 | TEMPERATURE 2 | HUMIDITY 1 | --- | PICTURE 2 |
| | | ENVIRONMENTAL CONDITION 6 | TEMPERATURE 2 | HUMIDITY 2 | --- | PICTURE 2 |
| CLUSTER 3 | ENVIRONMENT THAT ENCOURAGES OPENNESS | ENVIRONMENTAL CONDITION 7 | TEMPERATURE 2 | HUMIDITY 2 | SOUND 4 | PICTURE 3 |
| | | ENVIRONMENTAL CONDITION 8 | TEMPERATURE 1 | HUMIDITY 2 | SOUND 4 | PICTURE 3 |
| | | ENVIRONMENTAL CONDITION 9 | TEMPERATURE 1 | HUMIDITY 2 | SOUND 3 | PICTURE 3 |

FIG. 3

STORAGE UNIT

| NUMBER OF CLUSTER | ENVIRONMENTAL CONDITION | |
|---|---|---|
| | NUMBER OF ENVIRONMENTAL CONDITION | PRIORITY |
| CLUSTER 1 | ENVIRONMENTAL CONDITION 1 | 1 |
| | ENVIRONMENTAL CONDITION 2 | 2 |
| | ENVIRONMENTAL CONDITION 3 | 3 |
| CLUSTER 2 | ENVIRONMENTAL CONDITION 4 | 3 |
| | ENVIRONMENTAL CONDITION 5 | 1 |
| | ENVIRONMENTAL CONDITION 6 | 2 |
| CLUSTER 3 | ENVIRONMENTAL CONDITION 7 | 2 |
| | ENVIRONMENTAL CONDITION 8 | 3 |
| | ENVIRONMENTAL CONDITION 9 | 1 |

ENVIRONMENTAL CONDITION STORAGE DEVICE, ENVIRONMENTAL CONDITION STORAGE METHOD, OPERATION DEVICE, AND ENVIRONMENT RECOGNITION DEVICE

CROSS-REFERENCE TO RELATED APPLICATIONS

This U.S. National stage application claims priority under 35 U.S.C. § 119(a) to Japanese Patent Application Nos. 2019-003124, filed in Japan on Jan. 11, 2019, and 2019-207484, filed in Japan on Nov. 15, 2019, the entire contents of which are hereby incorporated herein by reference.

BACKGROUND

Field of the Invention

The present disclosure relates to an environmental condition storage device, an environmental condition storage method, an operation device, and an environment recognition device.

Background Information

Devices that reproduce environments experienced by persons have been developed. For example, Japanese Unexamined Patent Application Publication No. 2003-299013 discloses an experience information reproduction apparatus that allows a person who has experienced an event to re-experience the event with realism.

SUMMARY OF INVENTION

In Japanese Unexamined Patent Application Publication No. 2003-299013, however, it has not been possible to reproduce an environment that reflects a sensory orientation that a person internally has.

An environmental condition storage device according to a first aspect comprises an environmental condition acquisition unit, a tactile information acquisition unit, and a storage unit. The environmental condition acquisition unit acquires an environmental condition including at least one of a temperature, humidity, wind, a picture, an image, and a sound. The tactile information acquisition unit acquires tactile information, the tactile information being information indicating a tactile sensation. The storage unit stores the environmental condition and the tactile information in association with each other. It is therefore possible to generate an environment corresponding to a tactile sensation that more accurately reflects a sensory orientation that a person internally has.

An environmental condition storage device according to a second aspect is the environmental condition storage device according to the first aspect, further including a providing unit that provides a plurality of tactile sensations. The tactile information acquisition unit is configured to recognize a tactile sensation selected by a user among the plurality of tactile sensations to acquire the tactile information, the tactile information being information indicating the selected tactile sensation. It is therefore possible to generate an environment corresponding to a tactile sensation.

An environmental condition storage device according to a third aspect is the environmental condition storage device according to the second aspect, which recognizes a tactile sensation selected by the user on a basis of at least either one of a number of touches for the tactile sensations provided by the providing unit or a touch duration for the tactile sensations provided by the providing unit. It is therefore possible to more specifically grasp a person's sensory orientation based on a tactile sensation.

An environmental condition storage method according to a fourth aspect is an environmental condition storage method for storing an environmental condition, including a first step of acquiring an environmental condition including at least one of a temperature, humidity, wind, a picture, an image, and a sound, and tactile information that is information indicating a tactile sensation; and a second step of storing in a storage unit the environmental condition and the tactile information in association with each other. It is therefore possible to generate an environment corresponding to a tactile sensation close to a sensory orientation that a person internally has.

An environmental condition storage method according to a fifth aspect is the environmental condition storage method according to the fourth aspect, further including a third step of, after providing tactile sensations, recognizing a tactile sensation selected by a user, in which the first step includes recognizing the tactile sensation selected in the third step to acquire the tactile information that is information indicating the selected tactile sensation. It is therefore possible to generate an environment corresponding to a tactile sensation.

An environmental condition storage method according to a sixth aspect is the environmental condition storage method according to the fifth aspect, in which the third step includes recognizing the tactile sensation selected by the user on a basis of at least either one of a number of touches or a touch duration for the provided tactile sensations. It is therefore possible to more specifically grasp a person's sensory orientation based on a tactile sensation.

An operation device according to a seventh aspect is an operation device for operating an environment generation device that generates a specific environment in a target space in accordance with an environmental condition, comprising a providing unit, a recognition unit, a processing unit, and a communication unit. The providing unit has one or more touch surfaces and provides a plurality of tactile sensations. The recognition unit recognizes a tactile sensation selected by a user among the plurality of tactile sensations. The processing unit determines an environmental condition corresponding to the tactile sensation recognized by the recognition unit. The communication unit transmits the environmental condition determined by the processing unit to the environment generation device. It is therefore possible to provide an operation device for generating a specific environment in a target space on the basis of a tactile sensation.

An operation device according to an eighth aspect is the operation device according to the seventh aspect, in which the recognition unit is further configured to recognize the tactile sensation selected by the user on a basis of at least either one of a number of touches for the tactile sensations provided by the providing unit or a touch duration for the tactile sensations provided by the providing unit. It is therefore possible to more specifically grasp a person's sensory orientation based on a tactile sensation.

An operation device according to a ninth aspect is the operation device according to the seventh aspect or the eighth aspect, in which the providing unit has the plurality of touch surfaces made of different materials.

An operation device according to a tenth aspect is the operation device according to the seventh aspect or the eighth aspect, in which the providing unit is configured to generate vibrations on the one or more touch surfaces to provide a plurality of different tactile sensations.

An operation device according to an eleventh aspect is the operation device according to the seventh aspect or the eighth aspect, in which the providing unit is configured to control a temperature or humidity of the one or more touch surfaces to provide a plurality of different tactile sensations.

An operation device according to a twelfth aspect is the operation device according to the seventh aspect or the eighth aspect, in which the providing unit is configured to generate a voltage or a current on the one or more touch surfaces to provide a plurality of different tactile sensations.

An operation device according to a thirteenth aspect is the operation device according to the seventh aspect or the eighth aspect, in which the providing unit is configured to generate a magnetic force on the one or more touch surfaces to provide a plurality of different tactile sensations.

An operation method according to a fourteenth aspect is an operation method for operating an environment generation device that generates a specific environment in a target space in accordance with an environmental condition, including a step of, after providing tactile sensations, recognizing a tactile sensation selected by a user; a step of determining an environmental condition corresponding to the recognized tactile sensation; and a step of transmitting the determined environmental condition to the environment generation device. It is therefore possible to implement an operation method for generating a specific environment in a target space on the basis of a tactile sensation.

An operation method according to a fifteenth aspect is the operation method according to the fourteenth aspect, in which the step of recognizing a tactile sensation selected by a user includes recognizing the tactile sensation selected by the user on a basis of at least either one of a number of touches for the tactile sensations provided by a providing unit or a touch duration for the tactile sensations provided by the providing unit. It is therefore possible to more specifically grasp a person's sensory orientation based on a tactile sensation.

An environment recognition device according to a sixteenth aspect comprises a providing unit, a recognition unit, and a processing unit. The providing unit has one or more touch surfaces and provides a plurality of tactile sensations. The recognition unit recognizes a tactile sensation selected by a user among the plurality of tactile sensations. The processing unit determines an environmental condition corresponding to the tactile sensation recognized by the recognition unit. It is therefore possible to classify environmental conditions for generating a specific environment in a target space on the basis of a tactile sensation.

An environment recognition device according to a seventeenth aspect is the environment recognition device according to the sixteenth aspect, in which the recognition unit further recognizes a tactile sensation selected by the user on a basis of at least either one of a number of touches for the tactile sensations provided by the providing unit or a touch duration for the tactile sensations provided by the providing unit. It is therefore possible to more specifically grasp a person's sensory orientation based on a tactile sensation.

BRIEF DESCRIPTION OF DRAWINGS

FIG. 2 is a schematic diagram for describing a configuration of a control device 20.

FIG. 3 is a schematic diagram for describing information stored in a storage unit 21.

FIG. 7 is a schematic diagram for describing priority.

DETAILED DESCRIPTION OF EMBODIMENT(S)

Figure 1:
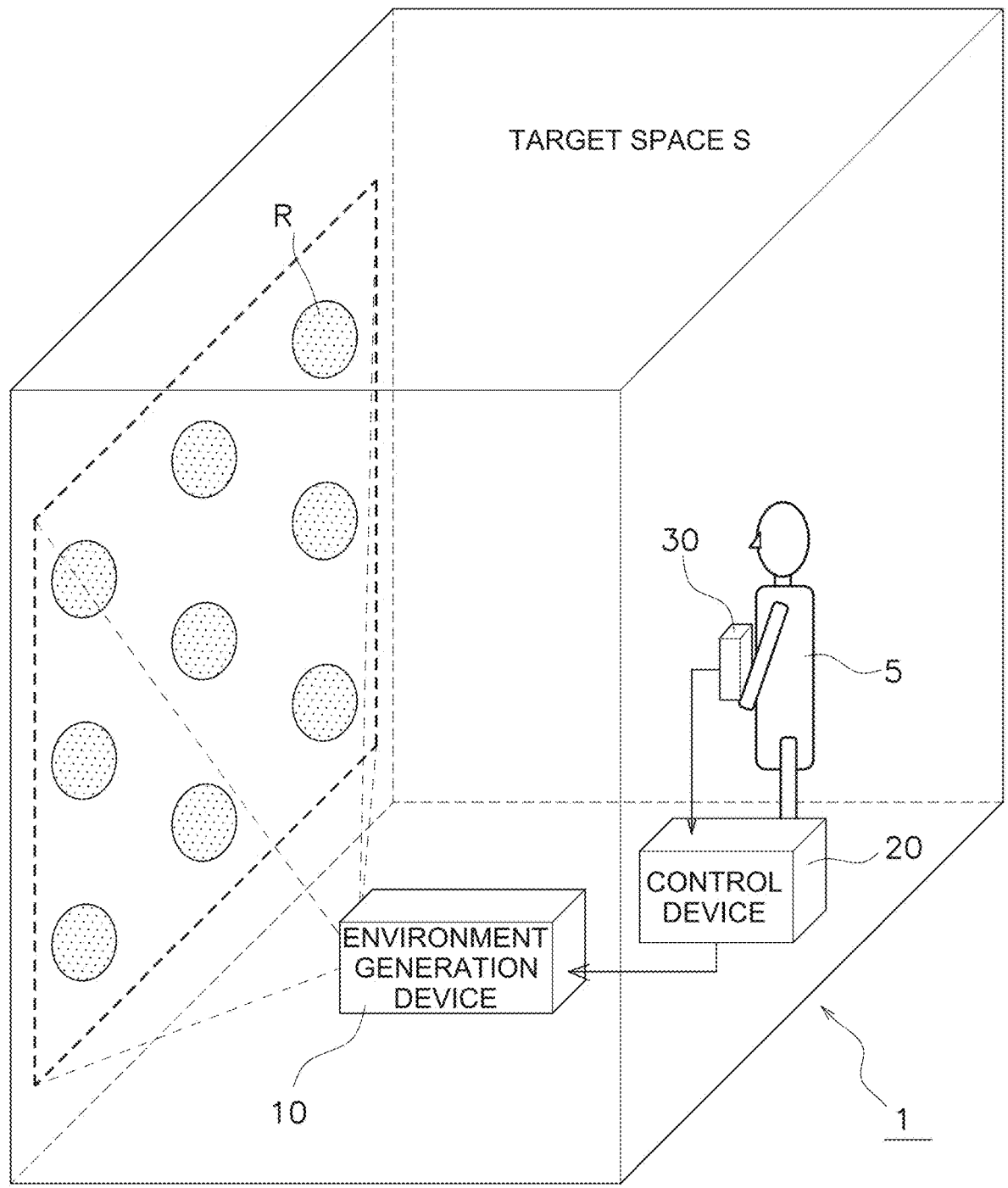
FIG. 1 is a schematic diagram for describing a configuration of an environment generation system 1.

(1) Environment Generation System
(1-1) Configuration of Environment Generation System As illustrated in FIG. 1, an environment generation system 1 according to this embodiment includes an environment generation device 10 and a control device 20.

(1-1-1) Environment Generation Device

The environment generation device 10 is any device capable of generating a specific environment by changing an environment in a target space S. As a result of the environment generation device 10 changing the environment, a specific influence is exerted on the sensation of a user 5 in the target space S. Specifically, the environment generation device 10 is formed by a device, examples of which include an air conditioner, a lighting device, a projector, a speaker, and an odor generator. For example, FIG. 1 illustrates how a projector serving as the environment generation device 10 projects a large number of display objects R onto a wall surface of the target space S to provide new appearance. In other words, in the example illustrated in FIG. 1, projection mapping changes the interior of the room. Alternatively, a robot may be placed in the target space S as the environment generation device 10. In this case, the robot changes at least a color of light to be emitted, a motion, a shape, and a sound.

Specifically, the environment generation device 10 generates a specific environment in the target space S in accordance with an environmental condition associated with a cluster described below.

The "environmental condition" is a parameter for characterizing a physical quantity that exerts a specific influence on the body and/or mind of a person. For example, an environmental condition is defined by a physical quantity (an example of a feature of the environmental condition) including at least one of a temperature, humidity, wind, a picture, an image, a sound, and the like, and the device that forms the environment generation device 10 operates in accordance with the environmental condition. The environment generation device 10 changes the environment to exert a specific influence on the sensation of a person.

The "specific influence" refers to an action of evoking a specific sensation in the five senses of the user 5. Examples of the specific influence include any environmental changes that evoke sensations such as a fascinating feeling (a feeling that increases the sensitivity to sensations in daily life that a person is likely to forget), a tense feeling (a feeling that a person feels motivated by someone watching the person while the person is doing something), an embrace feeling (a feeling of warmth and serenity like embracing the mind), an open feeling (a feeling of taking a deep breath in a spacious place), a start feeling (a feeling of being cheered on when taking a new step), and a travel feeling (a feeling of being a bit anxious but romantic). The specific influence can be expressed in any language, and may be expressed in a generally conceivable term such as an "enjoyable environment", an "environment that enhances concentration", or an "environment that encourages openness". Alternatively, the specific influence may be expressed in a term that is not necessarily clear in concept, such as an "environment with an atmosphere like being in a blanket", an "environment with a party atmosphere", an "environment with a rainbow-colored atmosphere", or an onomatopoeic word or a mimetic word related to a tactile sensation, such as a smooth feel (slippery), a rough feel (coarse), or a soft feel (fluffy).

Note that the correspondence relationships between specific influences and environmental conditions can be defined by aggregating impressions and the like felt by the user 5 present in the target space S.

(1-1-2) Control Device

The control device 20 controls the environment generation device 10. The control device 20 can be implemented by any computer and, as illustrated in FIG. 2, includes a storage unit 21, an input unit 22, a processing unit 23, a control unit 24, and an output unit 25. The functions described above are implemented by loading a program stored in a storage device (such as a ROM or a RAM) into a CPU, a GPU, or the like of the computer. However, this is not limiting, and the control device 20 may be implemented as hardware by using an LSI (Large Scale Integration), an ASIC (Application Specific Integrated Circuit), an FPGA (Field-Programmable Gate Array), or the like.

The storage unit 21 is configured to store various types of information and is implemented by any storage device such as a memory or a hard disk. Here, the storage unit 21 stores a feature of a cluster and environmental conditions in association with each other. Specifically, a cluster is composed of a group of environmental conditions in a space represented by n-dimensional information (n is the number of parameters for the environmental conditions). Alternatively, a cluster is composed of a region including environmental conditions in a space represented by n-dimensional information. A unique feature is set for each cluster. For example, as illustrated in FIG. 3, the storage unit 21 stores information indicating a physical amount including at least one of a temperature, humidity, wind, a picture, an image, a sound, and the like as n-dimensional information. These values are grouped into a cluster in accordance with a predetermined clustering method, and a feature of the cluster is set. The feature of the cluster, as used here, corresponds to the specific influence described above. In the example illustrated in FIG. 3, the "enjoyable environment" is set as the feature of cluster 1, the "environment that enhances concentration" is set as the feature of cluster 2, and the "environment that encourages openness" is set as the feature of cluster 3. A plurality of environmental conditions belong to each cluster. In the example illustrated in FIG. 3, environmental conditions 1 to 3 belong to the cluster 1, environmental conditions 4 to 6 belong to the cluster 2, and environmental conditions 7 to 9 belong to the cluster 3. It is also possible to further subdivide the clusters to define new clusters. In the example illustrated in FIG. 3, for example, when a new environmental condition 10 is added, the environmental conditions 7 and 8 among the environmental conditions 7 to 9 of the cluster 3 and the new environmental condition 10 may be used to define a new cluster. The new cluster may be tagged with a new feature such as a "bright environment".

The input unit 22 receives an input of various types of information via any terminal device 30 including a keyboard, a mouse, a touch panel, and so on. Here, the input unit 22 receives an input corresponding to a feature of a cluster. For example, the input unit 22 receives an input corresponding to a feature of one cluster from a list displayed in any form. The terminal device 30 may be a tactile sensation selection device 80 or an operation device 85 as an application of the tactile sensation selection device 80 illustrated in FIG. 16 to FIG. 18.

The processing unit 23 is configured to execute various information processing operations and is implemented by a processor, such as a CPU or a GPU, and a memory. Specifically, the processing unit 23 has a function of selecting one environmental condition among environmental conditions belonging to a cluster. More specifically, the processing unit 23 randomly selects another environmental condition belonging to the same cluster under a predetermined condition. When the predetermined condition is satisfied, the processing unit 23 changes the current environmental condition to the other environmental condition in the same cluster. Note that the predetermined condition refers to, for example, a state in which a predetermined time has elapsed or a state in which a predetermined reaction was not successfully obtained from the user 5 in the target space S.

The control unit 24 controls the environment generation device 10. Specifically, the control unit 24 extracts an environmental condition for controlling the environment generation device 10 from the storage unit 21 in accordance with the feature of the cluster described above, and controls the environment generation device 10 in accordance with the extracted environmental condition.

The output unit 25 outputs control information for controlling the environment generation device 10 in accordance with the output destination. For example, when the output destination is the terminal device 30 of the user 5, the output unit 25 outputs the control information converted into a display format corresponding to the user interface of the terminal device 30.

(1-2) Operation of Environment Generation System

Figure 4:
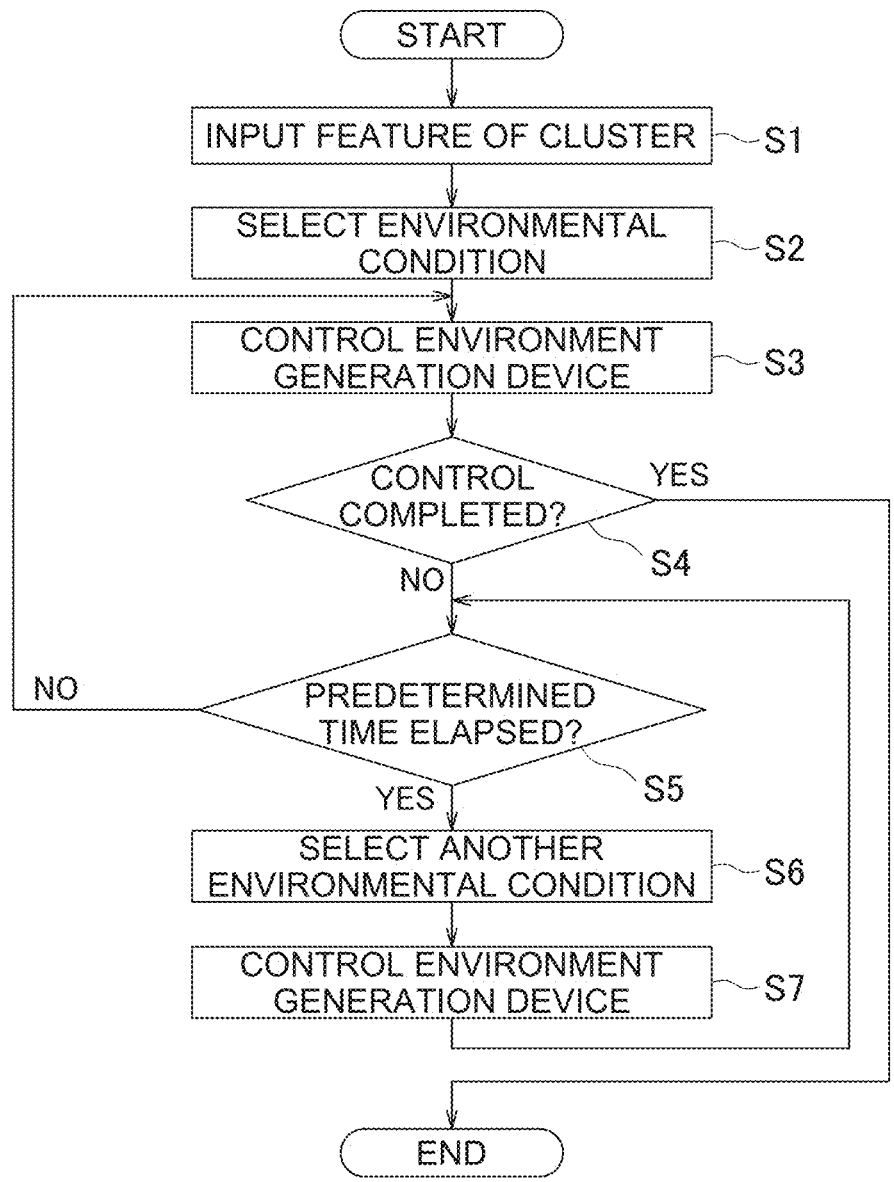
FIG. 4 is a flowchart for describing the operation of the environment generation system 1.

FIG. 4 is a flowchart for describing the operation of the environment generation system 1 according to this embodiment.

First, an input corresponding to a feature of a cluster for generating an environment in the target space S is received via the input unit 22 (S1). Here, a list such as a pull-down menu list in which a plurality of pieces of input information corresponding to features of clusters are defined in advance is displayed on the terminal device 30 of the user 5. Subsequently, the user 5 selects a piece of input information corresponding to a feature of one cluster from within the list via the terminal device 30. In the example corresponding to FIG. 3, the list shows the "enjoyable environment", the "environment that enhances concentration", the "environment that encourages openness", and so on in a selectable state. It is assumed here that the user 5 selects the "enjoyable environment" via the terminal device 30. As a result, the "enjoyable environment" is input from the input unit 22 as the feature of the cluster.

Then, in response to receipt of the input corresponding to the feature of the cluster by the input unit 22, the processing unit 23 selects one environmental condition among the environmental conditions belonging to the cluster (S2). In the example corresponding to FIG. 3, the "environmental condition 1", the "environmental condition 2", and the "environmental condition 3" belong to the cluster 1 representing the "enjoyable environment", and one of the environmental conditions is randomly selected by the processing unit 23. It is assumed here that the processing unit 23 selects the "environmental condition 1".

Then, the control unit 24 controls the environment generation device 10 in accordance with the environmental condition selected by the processing unit 23 (S3). As a result, a specific environment is generated in the target space S. In the example illustrated in FIG. 3, the environment generation device 10 is controlled in accordance with the environmental condition 1.

Thereafter, the environment generation device 10 is controlled until the control of the environment generation device 10 is completed (S4). When a predetermined time has elapsed before the completion of the control of the environment generation device 10, the processing unit 23 selects another environmental condition belonging to the same cluster (S4—No, S5—Yes, S6). In the example corresponding to FIG. 3, one environmental condition among the other environmental conditions belonging to the same cluster 1, namely, the "environmental condition 2" and the "environmental condition 3", is randomly selected by the processing unit 23. As a result, it is assumed here that the "environmental condition 2" is selected by the processing unit 23.

Then, the control unit 24 controls the environment generation device 10 in accordance with the other environmental condition selected by the processing unit 23 (S7). In the example corresponding to FIG. 3, the environment generation device 10 is controlled in accordance with the environmental condition 2. When the predetermined time has further elapsed, the environmental condition 2 is changed to the environmental condition 3, and the environment generation device 10 is controlled in accordance with the environmental condition 3.

(1-3) Features

As described above, the control device 20 according to this embodiment stores, in the storage unit 21, a plurality of clusters to which environmental conditions for creating environments that exert specific influences on the body and/or mind of a person belong and features of the clusters in association with each other. The control device 20 controls the environment generation device 10, which generates a specific environment in the target space S, in response to receipt of an input corresponding to a feature of a cluster. As a result, the control device 20 can create environments that can evoke various feelings in the user 5. Further, the control device 20 according to this embodiment controls the environment generation device 10 in accordance with an environmental condition selected under a predetermined condition, making it possible to create a non-uniform environment. In particular, the processing unit 23 selects another environmental condition belonging to the same cluster under the predetermined condition, making it possible to avoid habituation of the user 5 to the specific environment in the target space S.

For example, with the use of the control device 20 according to this embodiment, when the environmental condition 1 for generating an "environment with an increased sense of exaltation" and the environmental condition 2 for generating an "environment with an increased feeling of happiness" belong to the cluster corresponding to the "enjoyable environment", the control device 20 appropriately switches the environmental condition 1 and the environmental condition 2, thereby making it possible to provide an environment that gives people not only a mere pleasant feeling but also an increased sense of exaltation or an increased feeling of happiness.

(1-4) Modifications (1-4-1) Modification A

In the foregoing description, the input unit 22 uses a list displayed in any form when receiving an input corresponding to a feature of a cluster, although the control device 20 according to this embodiment is not limited to this. For example, the input unit 22 may be configured to receive an input of text by the user 5 when receiving an input corresponding to a feature of a cluster. In this case, the processing unit 23 analyzes the text in accordance with a predetermined algorithm and sets a feature of a cluster from the input of the text by the user 5.

Alternatively, the input unit 22 may receive an input using an expression related to the sensations of a person, such as an onomatopoeic word or a mimetic word, including an onomatopoeic word or a mimetic word related to a tactile sensation. In this case, the processing unit 23 performs analysis in accordance with a predetermined algorithm and sets a feature of a cluster from the input of the sensation corresponding to the onomatopoeic word or mimetic word by the user 5. Alternatively, the input unit 22 may receive an input based on a tactile sensation (material) from the tactile sensation selection device 80 described later.

(1-4-2) Modification B

In the foregoing description, the processing unit 23 randomly changes the environmental condition when the predetermined time has elapsed, although the control device 20 according to this embodiment is not limited to this. The control device 20 according to this embodiment may be configured to change the environmental condition when the predetermined condition is not satisfied instead of when the predetermined time has elapsed.

Figure 5:
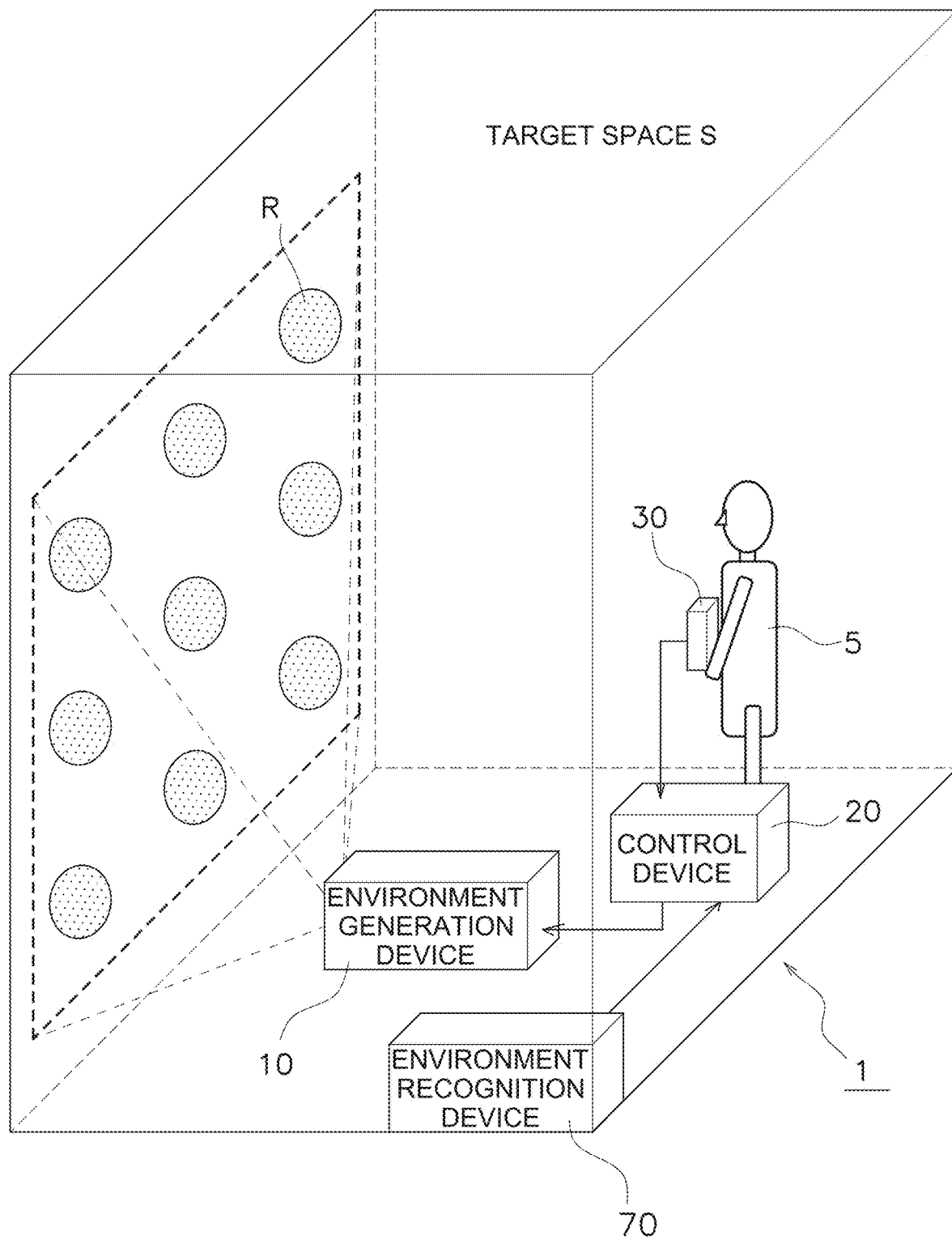
FIG. 5 is a schematic diagram for describing a configuration of an environment generation system 1 according to modification B.
Figure 6:
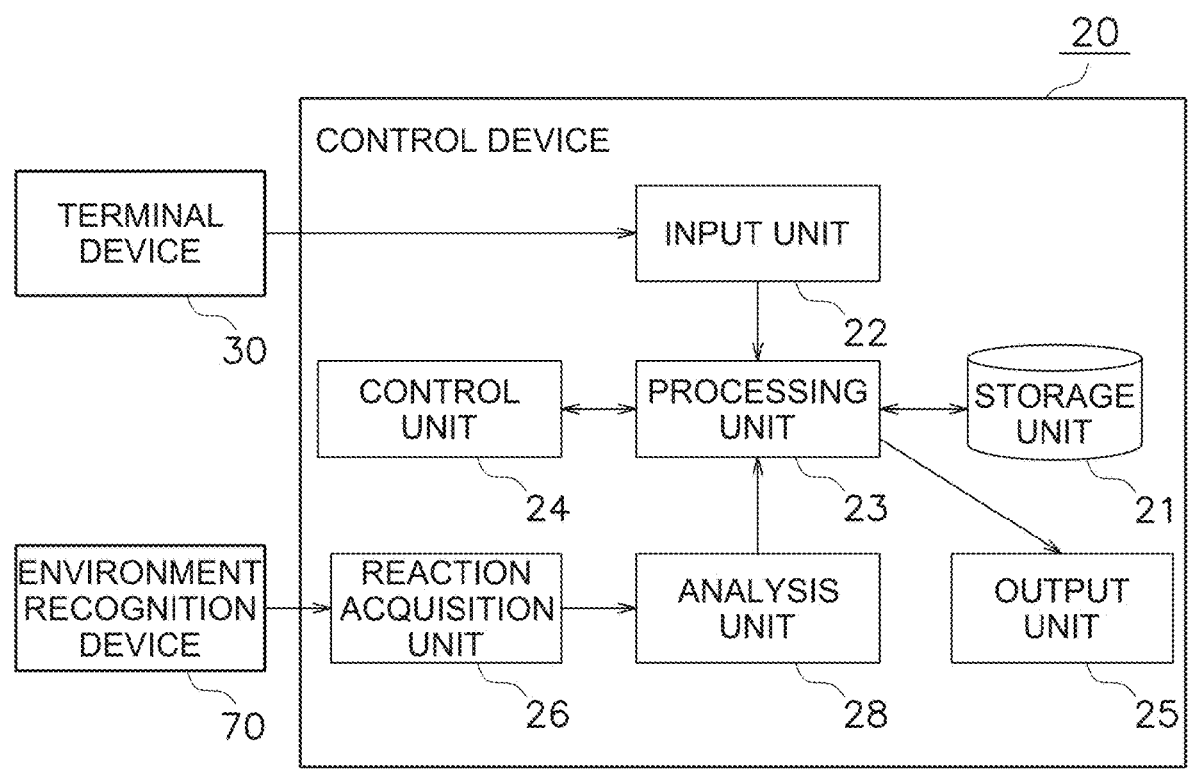
FIG. 6 is a schematic diagram for describing a configuration of a control device 20 according to modification B.

For example, as illustrated in FIG. 5, an environment recognition device 70 formed by one of any biological sensor, an imaging device, a recording device, a touch device, and a robot, any combination thereof, or the like is installed in the target space S. As illustrated in FIG. 6, a computer of the control device 20 further functions as a reaction acquisition unit 26, and the reaction acquisition unit 26 collects information on the user 5 present in the target space S, such as the physical condition, facial expression, behavior, and words and actions, from the environment recognition device 70 and acquires reaction information indicating a reaction of the user 5 present in the target space S. An analysis unit 28 performs analysis, such as analysis of the facial expression of the user, on the basis of the reaction information acquired by the reaction acquisition unit 26. The processing unit 23 changes the environmental condition in accordance with the analysis result obtained by the analysis unit 28.

Specifically, it is assumed that the feature of the cluster is the "enjoyable environment". It is also assumed that the analysis unit 28 performs analysis of the facial expression of the user 5 in the target space S. In the analysis result obtained by the analysis unit 28, if the number of pictures of the user 5 smiling exceeds a predetermined value, the processing unit 23 determines that the environment generated under the current environmental condition exerts an expected influence on the user 5 in the target space S, and performs control to maintain the current environmental condition. This configuration makes it possible to generate an environment according to the reaction of the user 5 present in the target space S.

Note that the environment recognition device 70 does not need to be fixed in the target space S and may be a device to be attached to the user 5, such as a fitness tracker.

(1-4-3) Modification C

In the foregoing description, the processing unit 23 randomly changes the environmental condition to a next environmental condition when the predetermined time has elapsed, although the control device 20 according to this embodiment is not limited to this. For example, when the predetermined time has elapsed, the processing unit 23 of the control device 20 may change the environmental condition to a next environmental condition according to priority. As illustrated in FIG. 7, the priority is set for each cluster. The priority can be downloaded and updated whenever necessary.

The priority may be appropriately learned in accordance with the usage by the user 5. Alternatively, the priority may be appropriately learned on the basis of personal information of the user 5.

(1-4-4) Modification D

In the control device 20 according to this embodiment, the processing unit 23 may have a function of determining the priority of the environmental conditions described above. Specifically, the control device 20 further includes the reaction acquisition unit 26 described above. In addition, the processing unit 23 further has a function of determining the priority of environmental conditions belonging to each cluster on the basis of the reaction information acquired by the reaction acquisition unit 26 (information indicating the reactions of the user 5 present in the target space S).

Figure 8A:
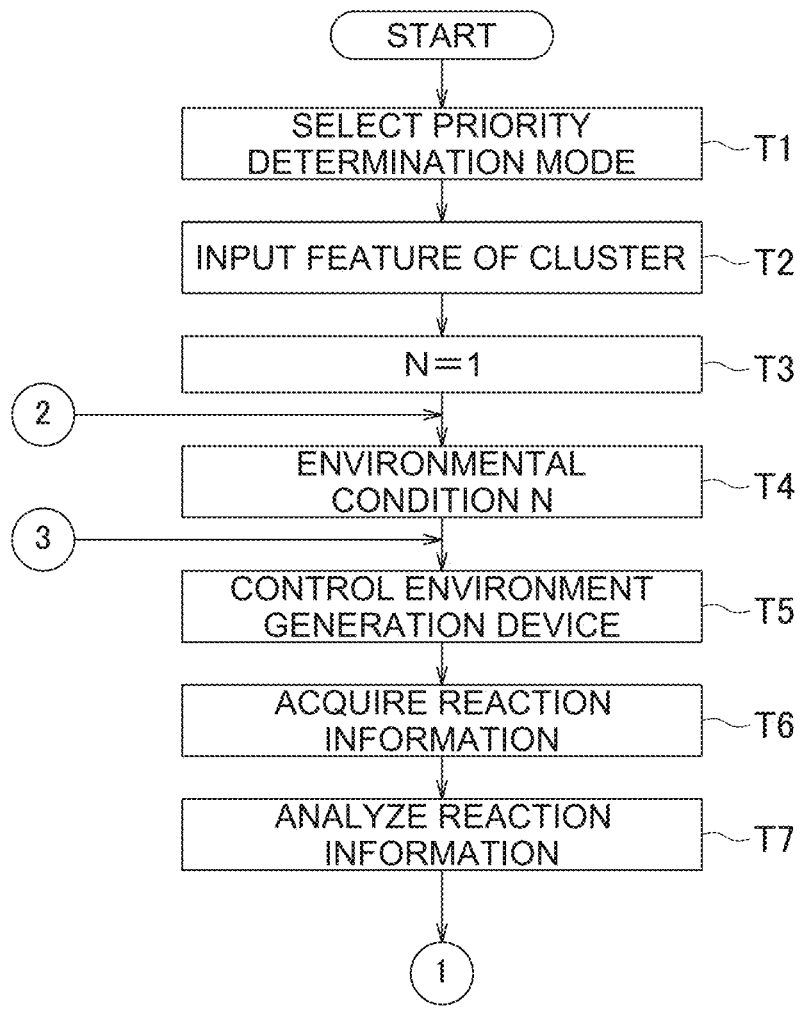
FIG. 8A is a flowchart for describing a process for determining priority.
Figure 8B:
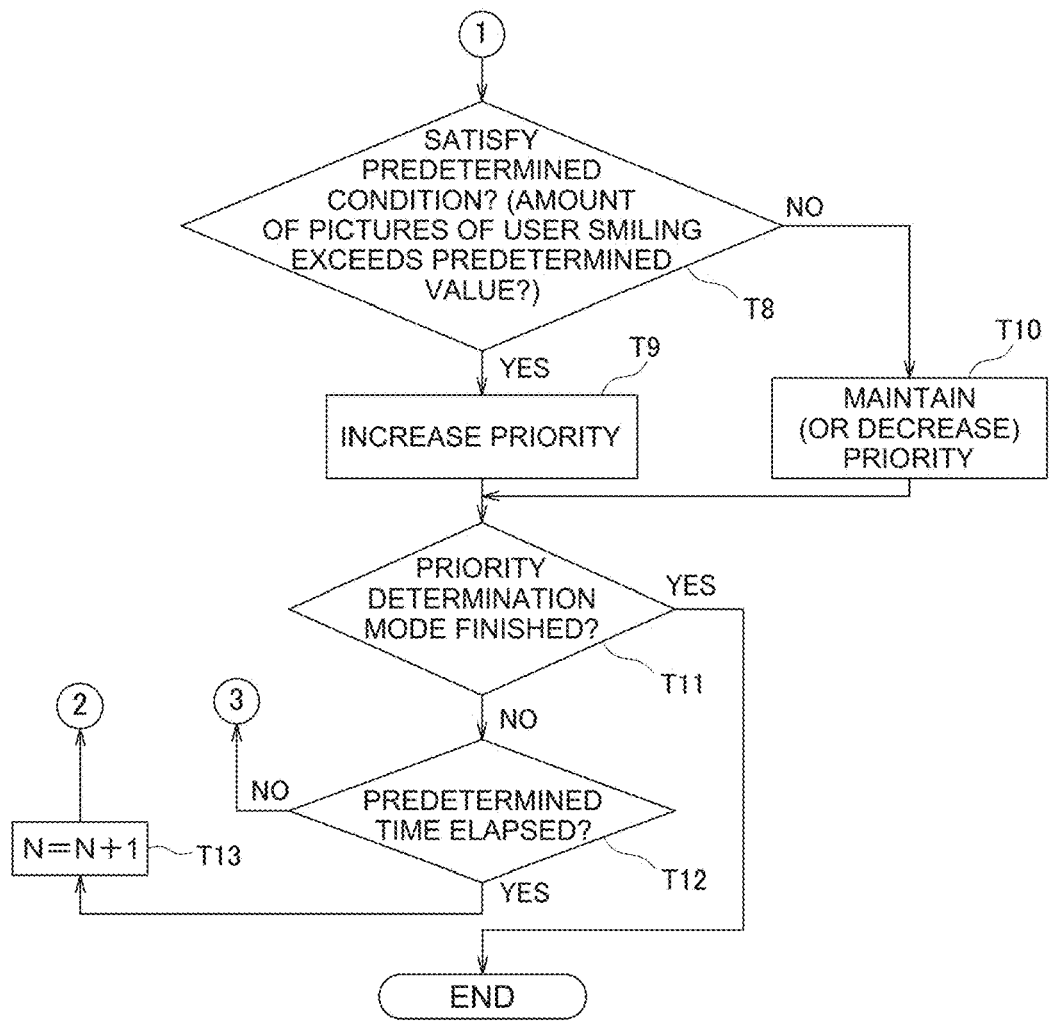
FIG. 8B is a flowchart for describing the process for determining priority.

The determination of the priority will be described with reference to a flowchart illustrated in FIG. 8.

First, in the control device 20, a priority determination mode is selected (T1). Then, an input corresponding to a feature of a cluster is received (T2). It is assumed here that the "enjoyable environment" is input as the feature of the cluster. Then, the environment generation device 10 is controlled under a predetermined environmental condition N (T3, T4, and T5). In the priority determination mode, the reaction acquisition unit 26 acquires the facial expression or the like of the user 5 in the target space S as reaction information (T6). Then, the analysis unit 28 analyzes the reaction information (T7). Here, the analysis unit 28 performs analysis of the facial expression and the like of the user 5. The processing unit 23 determines whether the predetermined condition is satisfied on the basis of the result of the facial expression analysis and the like (T8). Here, as a result of the facial expression analysis and the like, for example, if the amount of pictures of the user 5 smiling exceeds a predetermined value (T8—Yes), the processing unit 23 determines that the environment generated under the current environmental condition N exerts a specific influence on the user 5 in the target space S, and performs an update to increase the priority value (T9). On the other hand, on the basis of the result of the analysis of the facial expression and the like, if the amount of pictures of the user 5 smiling does not exceed the predetermined value (T8—No), the processing unit 23 determines that the environment generated under the current environmental condition N does not exert a specific influence on the user 5 in the target space S, and does not change the priority value or performs an update to decrease the priority value (T10). Then, when a predetermined time has elapsed in the priority determination mode, the environment generation device 10 is controlled under the next environmental condition N+1 (T11—No, T12—Yes, T13, T4). Thereafter, the priority of the environmental condition is updated until the priority determination mode is canceled. Then, the priority converges according to the time length of the priority determination mode.

The determination or update of the priority may be performed by real-time processing or batch processing in which the reaction information acquired by the reaction acquisition unit 26 is periodically analyzed.

(1-4-5) Modification E

In the foregoing description, the processing unit 23 randomly changes the environmental condition when the predetermined time has elapsed, although the control device 20 according to this embodiment is not limited to this. For example, the environmental condition may be changed at any timing in accordance with an operation of the input unit 22 by the user 5.

Further, in the control device 20 according to this embodiment, the processing unit 23 may be configured to determine the priority of environmental conditions belonging to a cluster on the basis of the numbers of selections of the environmental conditions. Accordingly, the priority converges so as to select an environmental condition corresponding to the preference of the user 5 in accordance with the duration of use of the control device 20 by the user 5. The determination or update of the priority may be performed by real-time processing or batch processing in which information acquired by the reaction acquisition unit 26 is periodically analyzed.

(1-4-6) Modification F

The features and environmental conditions of the clusters stored in the storage unit 21 described above can be updated whenever necessary. The environment generation device 10 can be controlled on the basis of the updated information.

Specifically, the information stored in the storage unit 21 can be downloaded and updated whenever necessary. For example, when a set of environmental conditions for a specific influence, such as an "environment with a party atmosphere", is newly defined, information on the environmental conditions can be downloaded into the storage unit 21 for use.

(1-4-7) Modification G

In the foregoing description, the environment generation device 10 and the control device 20 are separate devices. However, these devices may be incorporated into the same device as a single unit.

(2) Cluster Classification Device The environmental conditions used in the environment generation system 1 described above can be classified using a cluster classification device. The following describes a first cluster classification device 50 that sets a feature of a cluster later, and a second cluster classification device 60 in which a feature of a cluster is set in advance.

(2-1) First Cluster Classification Device (2-1-1) Configuration of First Cluster Classification Device First, the first cluster classification device 50 will be described. As a premise, it is assumed that the environment generation device 10 is controlled by a control device 20X to generate a specific environment in the target space S. Note that the control device 20X has functions similar to those of the control device 20 described above and that an input unit 22X further has a function of inputting a predetermined environmental condition. For convenience of description, the suffix X is used for elements of the control device 20X different from those of the control device 20.

Figure 9:
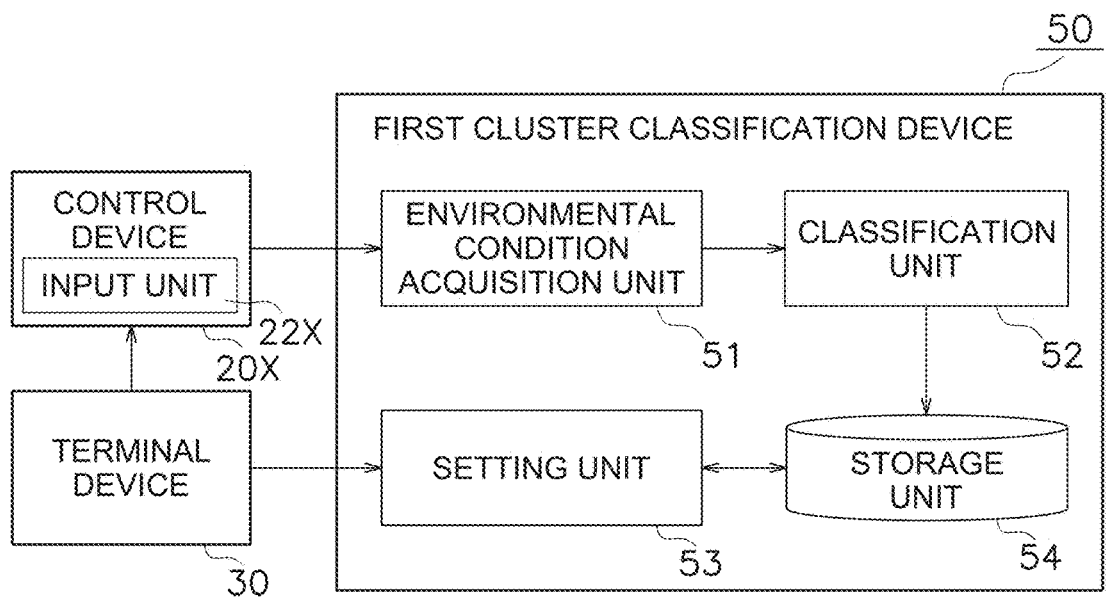
FIG. 9 is a schematic diagram for describing a configuration of a first cluster classification device 50.

FIG. 9 is a schematic diagram for describing a configuration of the first cluster classification device 50. The first cluster classification device 50 can be implemented by any computer and includes an environmental condition acquisition unit 51, a classification unit 52, a setting unit 53, and a storage unit 54. The functions of the first cluster classification device 50 are implemented by loading a program stored in a storage device (such as a ROM or a RAM) into a CPU, a GPU, or the like of the computer. However, this is not limiting, and the first cluster classification device 50 may be implemented as hardware by using an LSI (Large Scale Integration), an ASIC (Application Specific Integrated Circuit), an FPGA (Field-Programmable Gate Array), or the like.

Note that the first cluster classification device 50 and the control device 20X may not be separate, independent devices and may be incorporated into the same device as a single unit.

The environmental condition acquisition unit 51 acquires an environmental condition for generating a specific environment in the target space S. Here, in response to the operation of the terminal device 30, an environmental condition is appropriately input via the input unit 22X of the control device 20X, under which the environment generation device 10 is controlled. Accordingly, the environmental condition acquisition unit 51 acquires the environmental condition input via the input unit 22X of the control device 20X.

Figure 10:
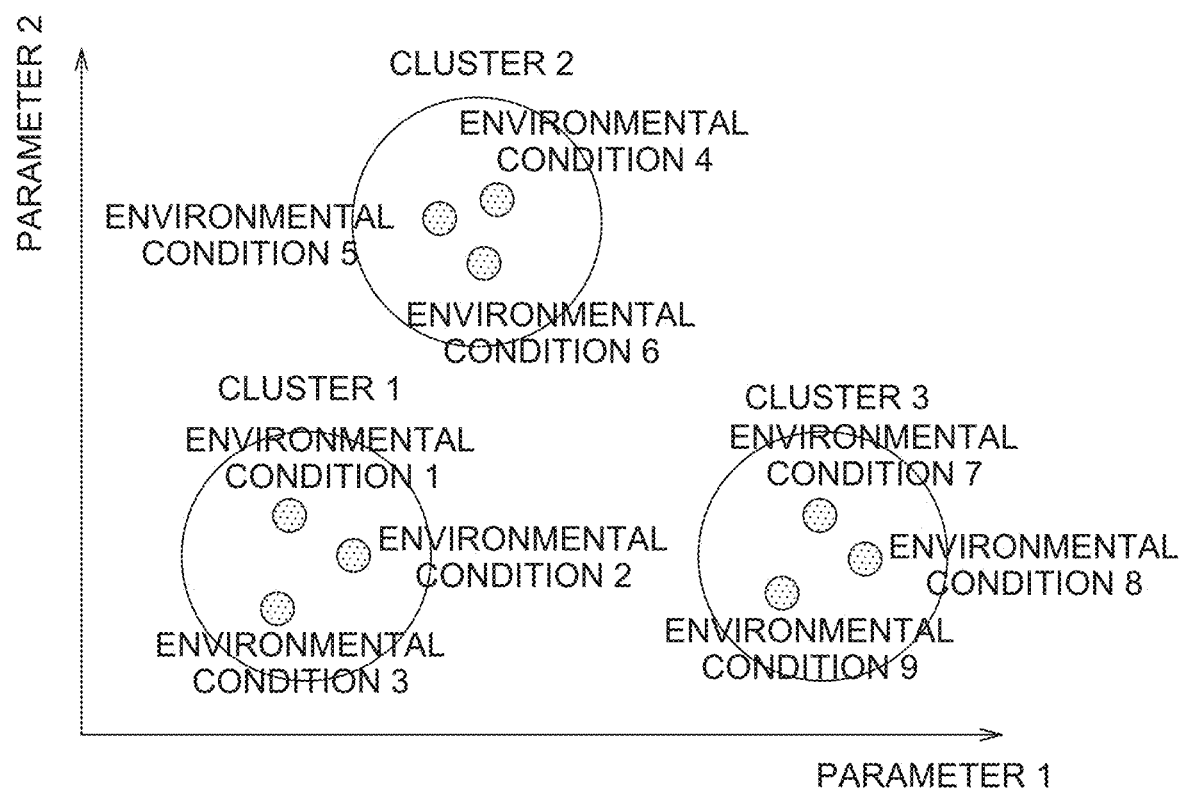
FIG. 10 is a schematic diagram for describing concepts of clusters.

The classification unit 52 clusters environmental conditions acquired by the environmental condition acquisition unit 51 on the basis of the features of the environmental conditions to generate a plurality of clusters. Each cluster includes a range of environmental conditions or a set of a plurality of environmental conditions. For clustering, an optimum clustering method (for example, the K-means method) can be appropriately adopted. Specifically, the classification unit 52 weights each of a plurality of parameters (here, n physical quantities) for the environmental conditions and sets, as the same cluster, environmental conditions at distances within a predetermined range in an n-dimensional space generated by the weighted parameters. For example, for convenience of description, assuming two parameters for the environmental conditions, as illustrated in FIG. 10, the environmental conditions 1 to 9 are plotted in a two-dimensional space. In the example illustrated in FIG. 10, the classification unit 52 classifies the environmental conditions 1 to 9 so that the environmental conditions 1 to 9 belong to a plurality of clusters 1 to 3.

The setting unit 53 receives input of information via any terminal device 30 or the like and sets the features of the clusters classified by the classification unit 52 on the basis of the received information. Here, the features of the clusters can be freely defined by a setting operator. For example, when the clusters 1, 2, and 3 are present, the setting operator can set the features of the clusters by using the function of the setting unit 53 such that the feature "enjoyable environment" is set for the cluster 1, the feature "environment that enhances concentration" is set for the cluster 2, and the feature "environment that encourages openness" is set for the cluster 3. Alternatively, features of clusters may be set using expressions using onomatopoeic words or mimetic words related to tactile sensations, such as a smooth feel ("Tsuru-tsuru" (slippery)), a rough feel ("Zara-zara" (coarse)), and a soft feel ("Fuwa-fuwa" (fluffy)). Here, the features of the clusters are set by attaching language labels as tags. In the setting of the features of the clusters, only one tag may be attached. However, it is possible to attach a plurality of tags to one cluster. For example, the feature of one cluster may be set by the tag "enjoyable" and the tag "open".

The storage unit 54 stores a cluster, a feature of the cluster, and an environmental condition in association with each other. The information stored in the storage unit 54 is written to any storage device, thereby making it possible to form the storage unit 21 of the control device 20 in the environment generation system 1 described above.

As described below, the first cluster classification device 50 may function as an environmental condition storage device including the functions of the storage device described above.

(2-1-2) Operation of First Cluster Classification Device

Figure 11:
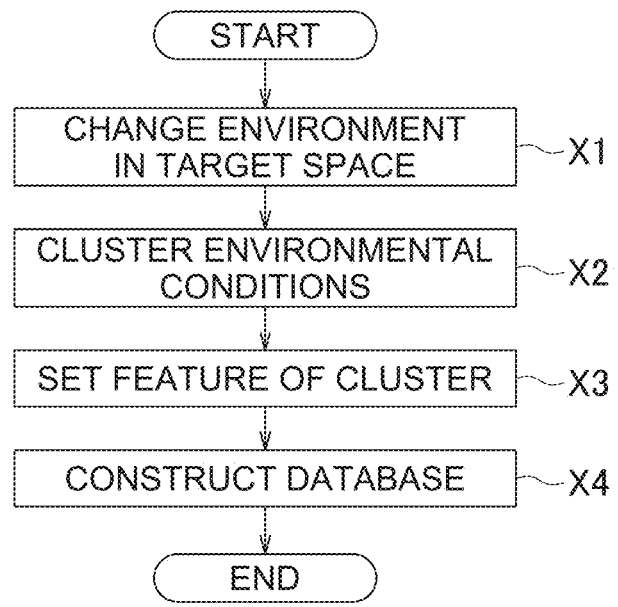
FIG. 11 is a flowchart for describing the operation of the first cluster classification device 50.

FIG. 11 is a flowchart for describing the operation of the first cluster classification device 50.

First, the environment generation device 10 and the control device 20X are used by a plurality of users for a predetermined period without constraint. Each user freely changes the environmental condition using the terminal device 30 and changes the environment in the target space S using the environment generation device 10 and the control device 20X (X1). The environmental condition may be freely changed by inputting a tactile sensation using the tactile sensation selection device 80 or the operation device 85 as an application of the tactile sensation selection device 80 described below.

Then, an analysis is made on the environmental conditions used in a period during which the environment generation device 10 and the control device 20X are used. Specifically, a plurality of environmental conditions are clustered by the classification unit 52, and one or more clusters are generated (X2).

Then, the setting operator inputs information indicating the features of the clusters using the terminal device 30 or the like. The features of the clusters are defined by the setting operator. In response to this, the setting unit 53 sets the features of the clusters (X3).

As a result, a database in which the features of the clusters are associated with the environmental conditions is constructed and stored in the storage unit 54 (X4).

As described above, the first cluster classification device 50 includes the environmental condition acquisition unit 51, the classification unit 52, the setting unit 53, and the storage unit 54. The environmental condition acquisition unit 51 acquires an environmental condition for generating a specific environment in the target space S. The classification unit 52 classifies the environmental conditions into a plurality of clusters. The setting unit 53 sets the features of the clusters. The storage unit 54 stores the features of the clusters and the environmental conditions in association with each other. In short, the first cluster classification device 50 classifies the environmental conditions into a plurality of clusters and receives setting of the features of the classified clusters. Since the first cluster classification device 50 has the configuration described above, the setting operator can set the features of the clusters later. On the basis of this, a database in which the features of the clusters are associated with the environmental conditions can be constructed.

Additionally, the first cluster classification device 50 classifies an environmental condition into a predetermined cluster to perform model evaluation, and performs model generation when an environmental condition is classified into a new cluster. In other words, when an environmental condition that is difficult to be classified into any existing cluster is generated by the user, the classification unit 52 of the first cluster classification device 50 adds a new cluster.

(2-1-3) Modifications

Figure 12:
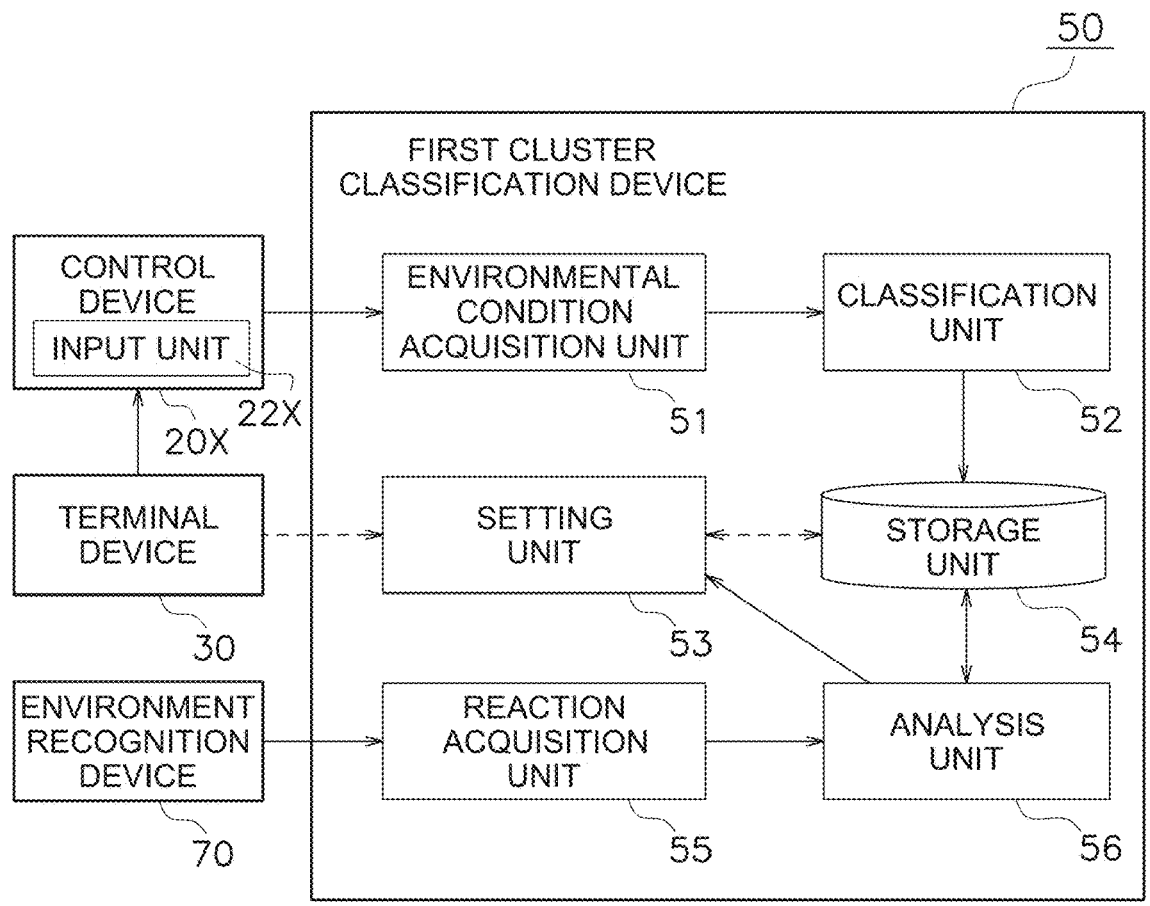
FIG. 12 is a schematic diagram for describing a configuration of a modification of the first cluster classification device 50.

In step X3 described above, instead of the features of the clusters being defined by the setting operator, the features of the clusters can be defined on the basis of the reactions of the user 5 present in the target space S. Specifically, the environment recognition device 70 formed by one of any biological sensor, an imaging device, a recording device, a touch device, and a robot, any combination thereof, or the like is installed in the target space S. As illustrated in FIG. 12, a computer of the first cluster classification device 50 further functions as a reaction acquisition unit 55, and the reaction acquisition unit 55 acquires reaction information indicating a reaction of the user 5 present in the target space S. Further, the computer of the first cluster classification device 50 further functions as an analysis unit 56, and the analysis unit 56 performs analysis of the facial expression or the like of the user 5 on the basis of the reaction information acquired by the reaction acquisition unit 55. On the basis of the analysis result obtained by the analysis unit 56, for example, if the amount of pictures of the user 5 smiling exceeds a predetermined value, the setting unit 53 also functioning as a portion of a processing unit characterizes the cluster corresponding to the environmental condition at that time as the "enjoyable environment". Then, the setting unit 53 stores the feature of the cluster and the environmental condition in the storage unit 54 in association with each other. Note that the environment recognition device 70 does not need to be fixed in the target space S and may be a device to be attached to the user 5, such as a fitness tracker.

Like the control device 20 illustrated in FIG. 6, the control device 20X may be provided with the reaction acquisition unit 26, and changes the environmental condition or changes the priority of the environmental condition in accordance with the analysis result based on the reaction information acquired by the reaction acquisition unit 26. On the other hand, the result of analysis of the reaction information acquired from the reaction acquisition unit 55 of the first cluster classification device 50 described above is used for characterizing the cluster.

Alternatively, in step X3 described above, when the setting operator defines a feature of a cluster, an input of text by the user 5 may be received. In this case, the setting unit 53 analyzes the text in accordance with a predetermined algorithm and identifies an impression received by the user 5 from the text. Then, the setting unit 53 sets the identified impression as the feature of the cluster.

Alternatively, in step X3 described above, when the setting operator defines a feature of a cluster, the feature of the cluster may be defined by reflecting the attribute of the target space S. For example, if the use of the target space S can be recognized in advance as a conference room, a restaurant, a hospice, or the like, information on the use is reflected in a feature of a cluster. In short, an "environment in an enjoyable conference room" or the like can be set as a feature of a cluster. Alternatively, features of clusters may be set using expressions using onomatopoeic words or mimetic words related to tactile sensations, such as a smooth feel ("Tsuru-tsuru" (slippery)), a rough feel ("Zara-zara" (coarse)), and a soft feel ("Fuwa-fuwa" (fluffy)). Alternatively, when defining a feature of a cluster, the setting operator may input a tactile sensation using the environment recognition device 70, which is an application of the tactile sensation selection device 80 described later, converting the input tactile sensation into a language label, and setting the feature of the cluster.

(2-2) Second Cluster Classification Device (2-2-1) Configuration of Second Cluster Classification Device Next, the second cluster classification device 60 will be described. As a premise, it is assumed that the environment generation device 10 is controlled by a control device 20Y to generate a specific environment in the target space S. Note that the control device 20Y has functions similar to those of the control device 20 described above and is different from the control device 20 in that an input unit 22Y is capable of inputting a predetermined environmental condition. For convenience of description, the suffix Y is used for elements of the control device 20Y different from those of the control device 20.

Figure 13:
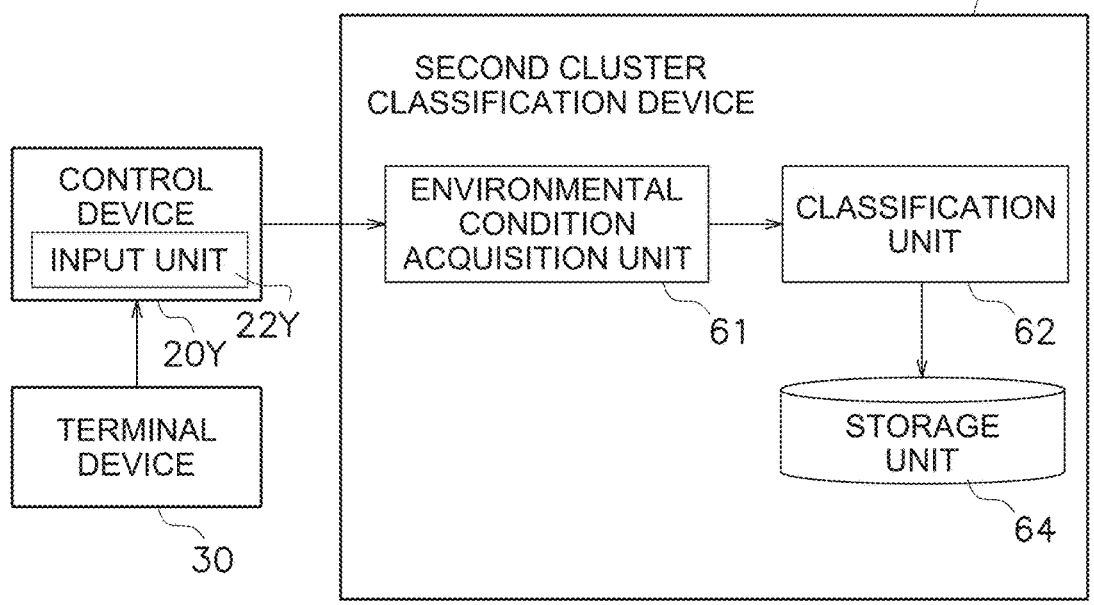
FIG. 13 is a schematic diagram for describing a configuration of a second cluster classification device 60.

FIG. 13 is a schematic diagram for describing a configuration of the second cluster classification device 60. The second cluster classification device 60 can be implemented by any computer and includes an environmental condition acquisition unit 61, a classification unit 62, and a storage unit 64. The functions described above are implemented by loading a program stored in a storage device (such as a ROM or a RAM) into a CPU, a GPU, or the like of the computer. However, this is not limiting, and the second cluster classification device 60 may be implemented as hardware by using an LSI (Large Scale Integration), an ASIC (Application Specific Integrated Circuit), an FPGA (Field-Programmable Gate Array), or the like.

Note that the second cluster classification device 60 and the control device 20Y may not be separate, independent devices and may be incorporated into the same device as a single unit.

The environmental condition acquisition unit 61 acquires an environmental condition for generating, in the target space S, a defined environment having a concept that is defined in advance. Examples of the "defined environment" include an "enjoyable environment", an "environment that enhances concentration", an "environment that encourages openness", onomatopoeic words or mimetic words related to tactile sensations, such as a smooth feel ("Tsurru-tsru" (slippery)), a rough feel ("Zara-zara" (coarse)), and a soft feel ("Fuwa-fuwa" (fluffy)). The "defined environment" may be defined by a tactile sensation. In this case, a "member having a smooth surface" or a "member having a rough surface", which can be physically felt, is presented to the user as the concept of the defined environment.

The environmental condition acquisition unit 61 acquires an environmental condition from the input unit 22Y of the control device 20 described above. Here, the concept of the defined environment is presented to the user, and the user is instructed to input an environmental condition to create the defined environment. In response to this instruction, the user operates the terminal device 30 and inputs the environmental condition via the input unit 22Y to control the environment generation device 10, in an attempt to generate the defined environment in the target space S. At this time, the environmental condition acquisition unit 61 appropriately acquires the environmental condition input by the operation of the terminal device 30 described above.

The classification unit 62 classifies the environmental condition into a predetermined cluster so as to correspond to the concept of the defined environment. For example, when an instruction is given to a plurality of users to generate an "enjoyable environment" as the defined environment, a group of environmental conditions input by the respective users via the input unit 22Y or a region including the environmental conditions is classified into the same cluster. The classification unit 62 eliminates abnormal values in accordance with a predetermined algorithm.

The storage unit 64 stores the concept of the defined environment and the environmental conditions in association with each other. Here, the concept of the defined environment is regarded as a feature of a cluster. Accordingly, the storage unit 64 stores a feature of a cluster and environmental conditions in association with each other. The information stored in the storage unit 64 is written to any storage device, thereby making it possible to form the storage unit 21 of the control device 20 in the environment generation system 1 described above.

As described below, the second cluster classification device 60 may function as an environmental condition storage device including the functions of the storage device described above.

(2-2-2) Operation of Second Cluster Classification Device

Figure 14:
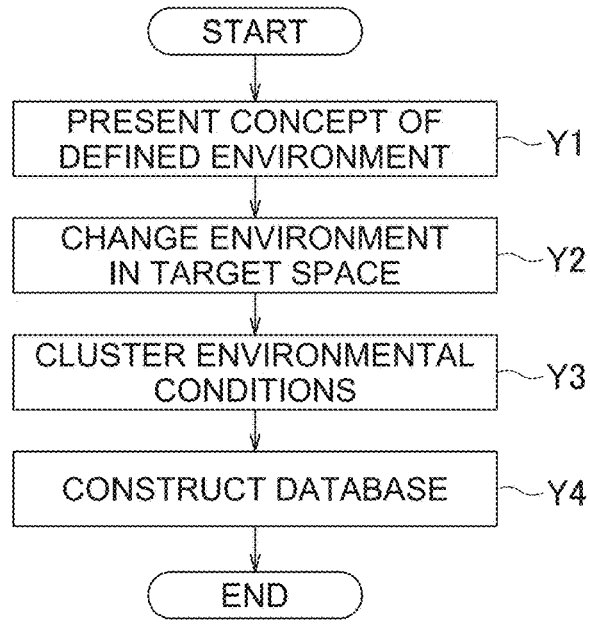
FIG. 14 is a flowchart for describing the operation of the second cluster classification device 60.

FIG. 14 is a flowchart for describing the operation of the second cluster classification device 60.

First, a plurality of users are presented with a concept of a defined environment (Y1) and are instructed to input an environmental condition to create the environment. Thereafter, the environment generation device 10 and the control device 20Y are used by each user for a predetermined period. Here, each user changes the environmental condition using the terminal device 30 via the control device 20Y so that the changed environmental condition matches the concept of the defined environment, in an attempt to generate the defined environment in the target space S using the environment generation device 10 (Y2).

Then, an analysis is made on the environmental condition used in a period during which the environment generation device 10 is used. Specifically, the classification unit 62 eliminates abnormal values in accordance with a predetermined algorithm, and clusters a plurality of environmental conditions set by the plurality of users for each concept of defined environment (Y3).

Then, the classification unit 62 determines the defined environment as a feature of a cluster and associates the feature of the cluster with the environmental condition. As a result, a database in which the feature of the cluster is associated with the environmental condition is constructed and stored in the storage unit 64 (Y4).

As described above, the second cluster classification device 60 includes the environmental condition acquisition unit 61, the classification unit 62, and the storage unit 64. The environmental condition acquisition unit 61 acquires an environmental condition for generating, in the target space S, a defined environment having a concept that is defined in advance. The classification unit 62 classifies the environmental condition into a predetermined cluster in accordance with the concept of the defined environment. The storage unit 64 stores the concept of the defined environment and the environmental conditions in association with each other. In short, the second cluster classification device 60 clusters environmental conditions in association with a defined environment. Since the second cluster classification device 60 has the configuration described above, the second cluster classification device 60 can collect and cluster a plurality of environmental conditions in a situation where the features of clusters are defined in advance. On the basis of this, a database in which the features of the clusters are associated with the environmental conditions can be constructed.

(2-2-3) Modifications

In step Y3 described above, combining the second cluster classification device 60 with the first cluster classification device 50 makes it possible to set a definition in which a feature of a predetermined dimension is further added to the defined environment. Specifically, a plurality of environmental conditions belonging to a concept of the defined environment, which are clustered by the classification unit 62 of the second cluster classification device 60, are classified into a plurality of new clusters by the classification unit 52 of the first cluster classification device 50. Then, the setting unit 53 of the first cluster classification device 50 sets, for the clusters, features of new clusters. As a result, for example, if the defined environment is an "enjoyable environment", a plurality of environmental conditions classified into the "enjoyable environment" can be classified into new clusters such as an "environment with an increased sense of exaltation" and an "environment with an increased feeling of happiness".

In other words, combining the first cluster classification device 50 with the second cluster classification device 60 makes it possible to collect, after presenting a vaguely defined environment (such as an "enjoyable environment"), environment information corresponding to more finely defined environments (such as an "environment with an increased sense of exaltation" and an "environment with an increased feeling of happiness"). On the basis of this, a database in which the features of the clusters are associated with the environmental conditions can be constructed.

Figure 15:
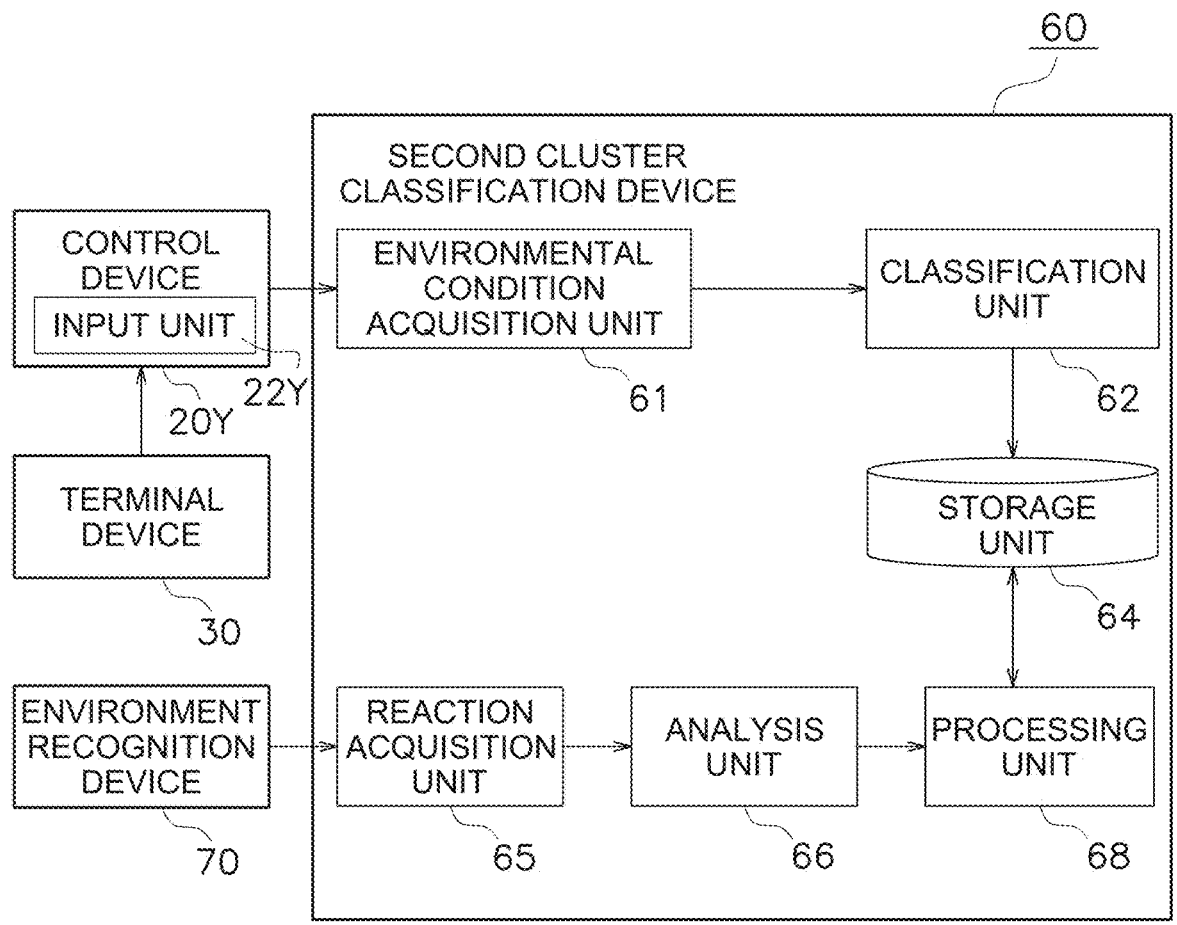
FIG. 15 is a schematic diagram for describing a configuration of a modification of the second cluster classification device 60.

In step Y3 described above, furthermore, a feature of a cluster can be defined by reflecting not only a concept of the defined environment but also a reaction of the user 5 present in the target space S. Specifically, the environment recognition device 70 formed by one of any biological sensor, an imaging device, a recording device, a touch device, and a robot, any combination thereof, or the like is installed in the target space S. As illustrated in FIG. 15, a computer of the second cluster classification device 60 further functions as a reaction acquisition unit 65, and the reaction acquisition unit 65 acquires reaction information indicating a reaction of the user 5 present in the target space S. Further, the computer of the second cluster classification device 60 also functions as an analysis unit 66, and the analysis unit 66 performs analysis of the facial expression or the like of the user 5 on the basis of the reaction information acquired by the reaction acquisition unit 65. On the basis of the analysis result obtained by the analysis unit 66, when the concept of the defined environment is an "enjoyable environment" and the amount of pictures of the user 5 smiling exceeds a predetermined value, a processing unit 68 characterizes a cluster corresponding to the environmental condition at that time as the "environment with an increased feeling of happiness", which is obtained by finely classifying the "enjoyable environment". Then, the processing unit 68 stores the feature of the cluster and the environmental condition in the storage unit 64 in association with each other. Note that the environment recognition device 70 does not need to be fixed in the target space S and may be a device to be attached to the user 5, such as a fitness tracker.

Like the control device 20 illustrated in FIG. 6, the control device 20Y may be provided with the reaction acquisition unit 26, and changes the environmental condition or changes the priority of the environmental condition in accordance with the analysis result based on the reaction information acquired by the reaction acquisition unit 26. On the other hand, the result of analysis of the reaction information acquired from the reaction acquisition unit 65 of the second cluster classification device 60 described above is used for characterizing (such as re-classifying) the cluster.

(3) Tactile Sensation Selection Device (3-1) Configuration

The tactile sensation selection device 80 given below can be used as part or all of the environment recognition device 70, the operation device 85, or the environmental condition storage device.

Figure 16:
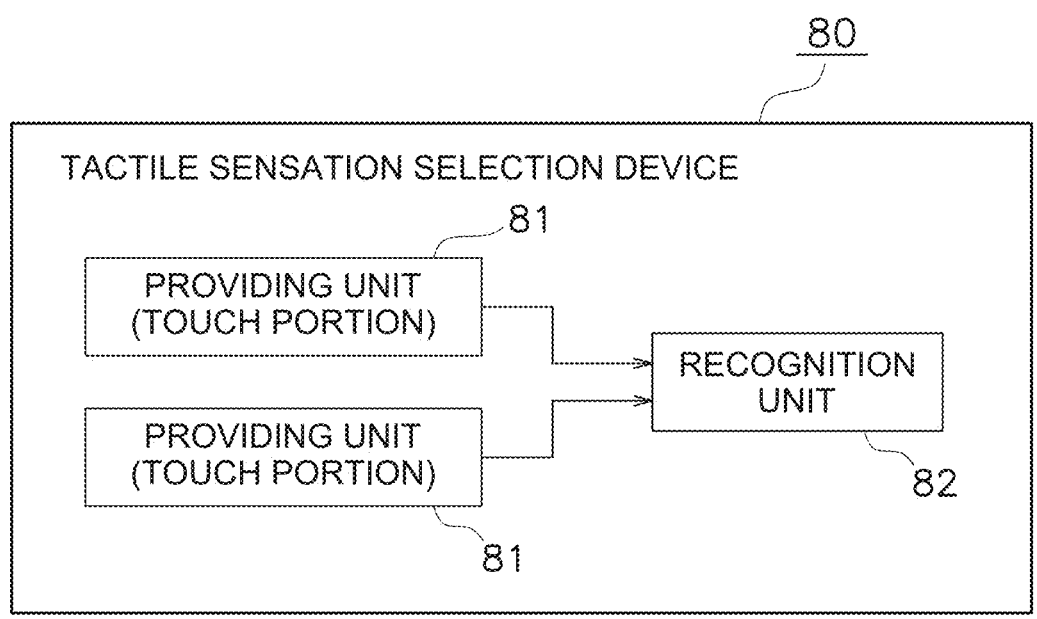
FIG. 16 is a schematic diagram for describing a configuration of a tactile sensation selection device 80.
Figure 17:
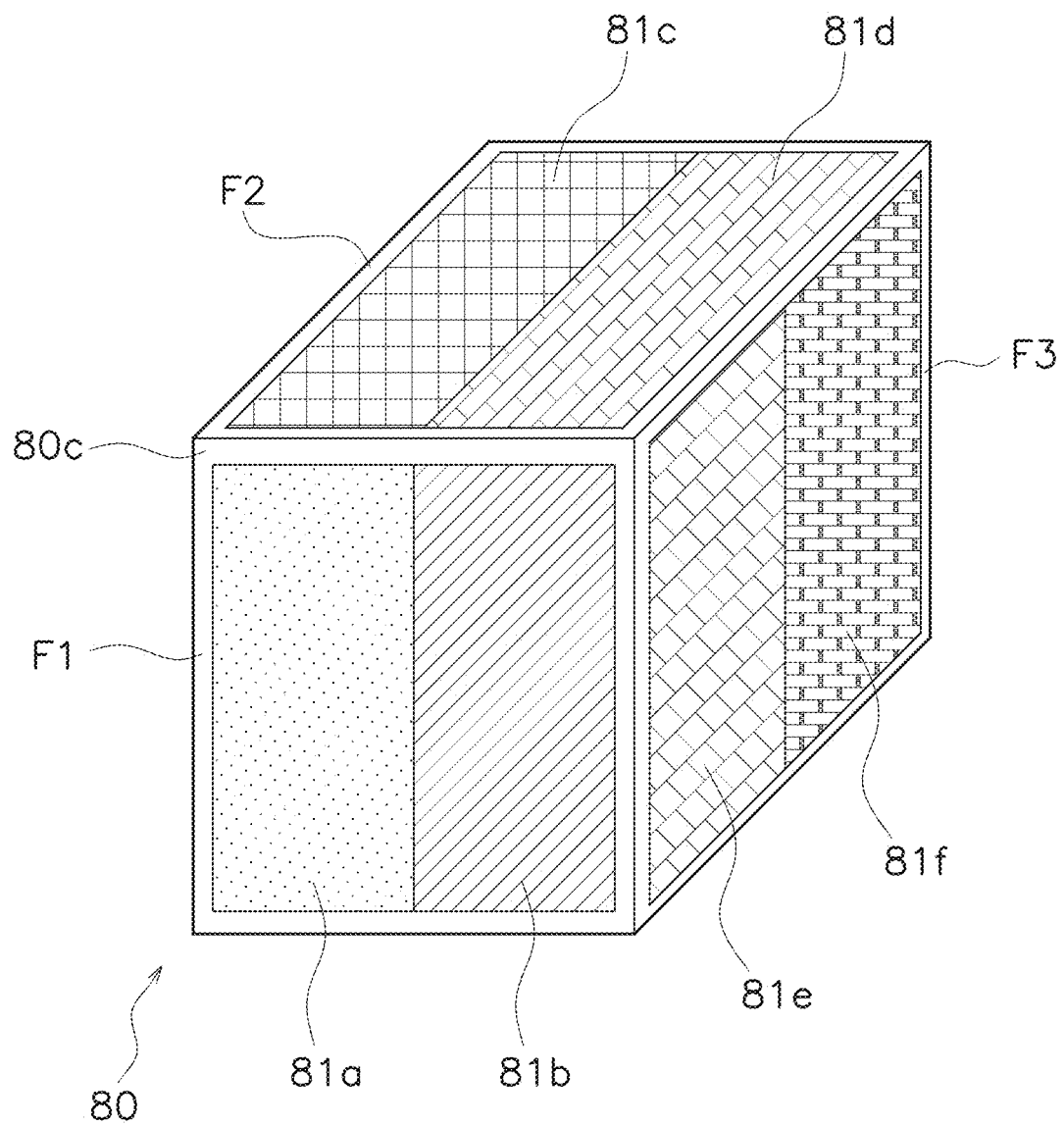
FIG. 17 is a schematic diagram for describing an example external appearance of the tactile sensation selection device 80.

As illustrated in FIG. 16, the tactile sensation selection device 80 includes providing units 81 and a recognition unit 82. The providing units 81 include a plurality of touch portions 81a, 81b, 81c, 81d, 81e, 81f, etc. Specifically, as illustrated in FIG. 17, the tactile sensation selection device 80 has a rectangular parallelepiped casing 80c having the plurality of touch portions 81a, 81b, 81c, 81d, 81e, 81f, etc. on surfaces thereof. FIG. 17 is a schematic diagram for describing an example external appearance of the tactile sensation selection device 80.

The providing units 81 individually provide different tactile sensations when the user 5 touches them. Examples of the different tactile sensations include a smooth feel (slippery feel), a rough feel (coarse feel), and a soft feel (fluffy feel), etc. These tactile sensations can be given by, for example, arrangement of a snake skin, a tatami mat, a feather, and the like. In short, at least two touch portions of the providing units 81 are formed of different materials.

In the example illustrated in FIG. 17, a first surface F1, a second surface F2, and a third surface F3 are provided with the touch portions 81a, 81b, 81c, 81d, 81e, and 81f such that two different tactile sensations are generated on each of the first surface F1, the second surface F2, and the third surface F3. Here, an evaluation axis for a predetermined sensation is determined for each surface, and two touch portions arranged on the same surface have different strengths. For example, rough feels are realized on the first surface F1 such that the right touch portion 81a provides a strong rough feel and the left touch portion 81b provides a weak rough feel. Smooth feels are realized on the second surface F2 such that the right touch portion 81c provides a strong smooth feel and the left touch portion 81d provides a weak smooth feel. Soft feels are realized on the third surface F3 such that the touch portion 81e closer to the viewer provides a strong soft feel and the touch portion 81f farther from the viewer provides a weak soft feel.

Figure 18:
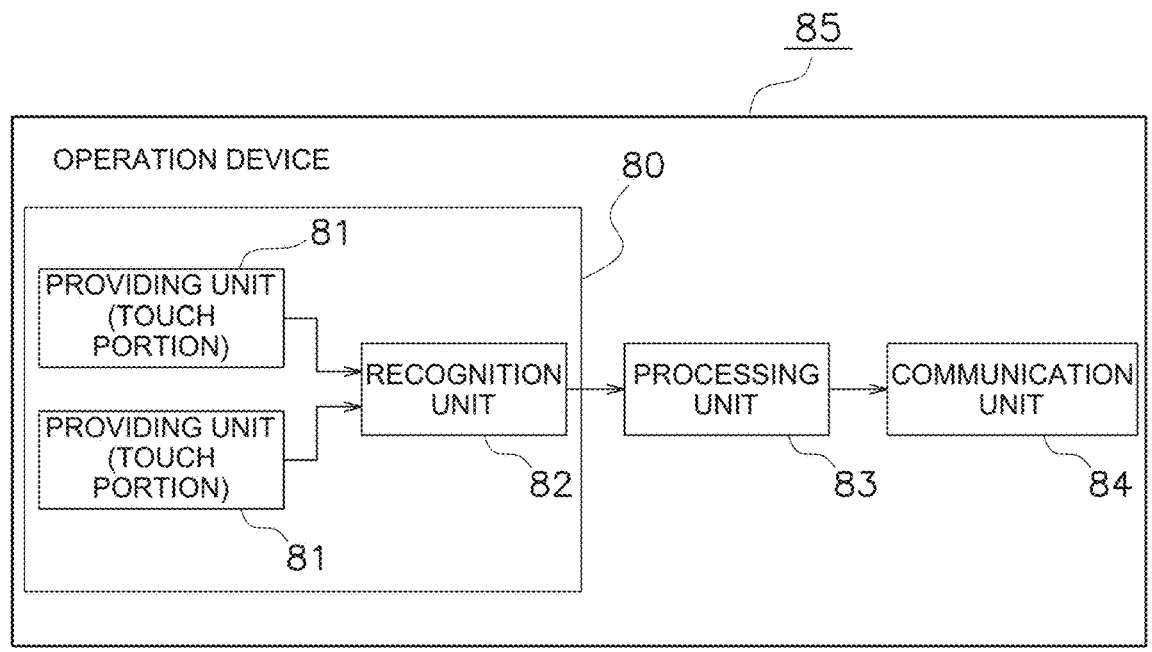
FIG. 18 is a schematic diagram illustrating a configuration of an operation device 85.

As illustrated in FIG. 18, the tactile sensation selection device 80 includes the providing units 81 and the recognition unit 82 described above. The recognition unit 82 is implemented by any processor and memory.

The recognition unit 82 recognizes the tactile sensation selected by the user 5. The recognition unit 82 recognizes the tactile sensation of the user 5 on the basis of the touch portion with which the user 5 touches. This makes it possible to recognize the tactile sensation corresponding to the state of the environment in the target space S in which the user 5 is present. Additionally, when expressing an individual's feeling, expressing the feeling by selecting a tactile sensation may more accurately reflect the sensory orientation (individual difference in orientation on feelings) that the individual internally has than expressing the feeling in language. For example, even when the "warm" feeling is evoked in the user 5 from the surrounding environment, even the user 5 may not be able to recognize whether the "warm" feeling is similar to the "warm" feeling obtained when the user 5 touches a blanket or the "warm" feeling obtained when the user 5 touches hot water, and this feeling can only be expressed as "warm" in words. In such a case, expressing the "warm" feeling through selection of a plurality of tactile sensations may more accurately express the feeling of the user 5.

The possibility that expression by selecting a tactile sensation might more accurately reflect the sensory orientation, which an individual internally has, in the generation of an environment than expression in language was specifically examined through the following experiment.

(3-2) Environment Generation Evaluation Experiment Based on Selection of Tactile Sensation The following hypothesis was developed: In a system for generating an environment, when selecting an environment, a user was able to more reliably achieve their desired environment by using a tactile sensation (for example, touching a "furry" material) than using language (emotional word: for example, "relaxed"), because the user was able to reflect their state that is difficult to express in language. To test this hypothesis, an evaluation experiment was performed by using a selection device for associating an input language with an environment (hereinafter, language selection device) and a selection device for associating a tactile sensation with an environment (hereinafter, tactile sensation selection device).

(3-2-1) Method of Experiment

The participants were 17 male and female students (ten males and seven females). The experiment was performed in a laboratory that was a room having four walls onto which an image could be projected. The participants participated for both a condition of using the language selection device and a condition of using the tactile sensation selection device. The language selection device and the tactile sensation selection device were used in counterbalanced order among the participants. The participants were instructed, "You can change the image in the space (room) by pressing a button (emotional word or tactile sensation). Each time the button is pressed, the images change. An image is projected according to the pressed button (emotional word or tactile sensation) (for example, "relaxed" (emotional word) or a furry tactile sensation). When you operate the selection device and are satisfied with a space (room), please press the SET button before leaving". Each participant stopped pressing the button (emotional word or tactile sensation) for both conditions at the time when they were satisfied with the spaces (rooms), and then left the laboratory.

A language selection device with buttons labeled emotional words, such as "tense", "relaxed", and "bright", was used.

A tactile sensation selection device with, as buttons, materials that the user feels a plurality of tactile sensations was used. The materials used include low repulsion urethane (that provides a furry tactile sensation), paper (that provides a silky tactile sensation), and gravel (that provides a gritty tactile sensation). The reasons that these three materials were selected for the tactile sensation selection device will be described below.

Images presented to the participants were generated using a statistical generation model. Predetermined images were used in which a preliminary examination had confirmed correspondence relationships between emotional words (for example, relaxed) or tactile sensations selected by the participants and impressions (for example, "feeling relaxed") of images presented in the space (room). Different images were generated and presented in response to an operation of the same language selection device or the same tactile sensation selection device on the basis of a generation model corresponding to a tactile sensation or an emotional word selected by the participants each time the selection was performed.

As images generated and presented in the experiment, images associated with emotional words and tactile sensations by a method such as clustering are used. The examination of the association will be described below.

(3-2-2) Evaluation Index

The participants were asked about a control target, such as "What space did you wish?", immediately after using the language selection device and immediately after using the tactile sensation selection device. A plurality of items were set for the control target, such as a room that makes people relaxed, a room with pathos, a room that makes people feel bright, a room that makes people feel tense, a room that makes people feel excited, a room for which people feel veneration, and others (in free answer form, for example, "impersonal room"), and the participants were asked to select one answer from among them.

After using the language selection device and the tactile sensation selection device, the participants were asked to select which selection device "created a room with the desired atmosphere" and "was enjoyable to operate" between the language selection device and the tactile sensation selection device. The participants were further asked to answer the impressions of using the respective selection devices in free answer form.

(3-2-3) Experimental Results

Figure 21:
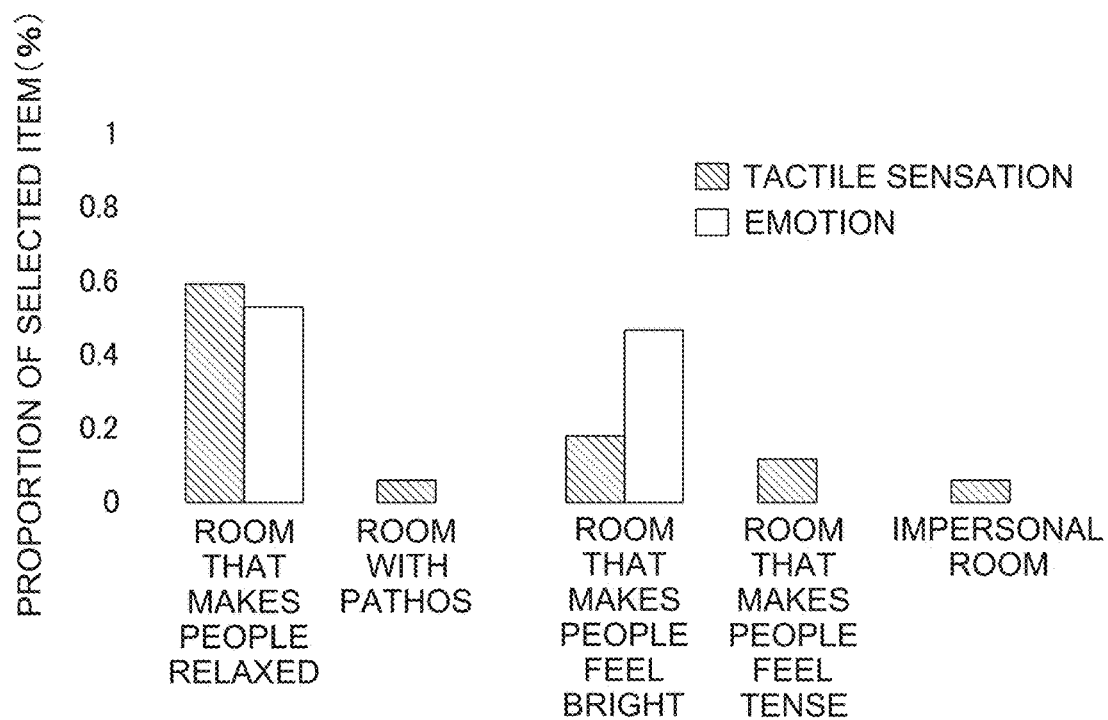
FIG. 21 is a graph of experimental results for examining the effect of environment generation based on tactile sensations.
Figure 22:
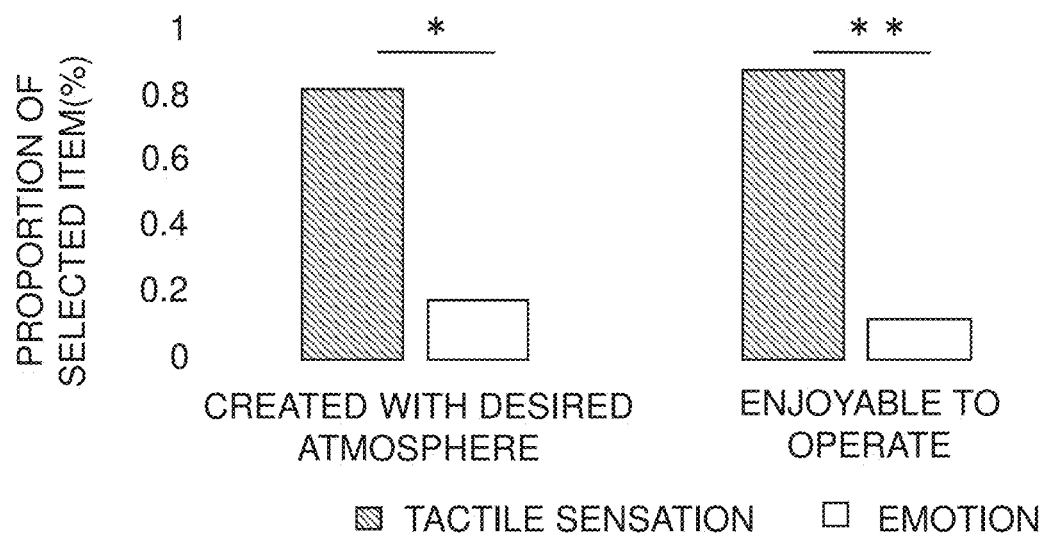
FIG. 22 is a graph of experimental results for examining the effect of environment generation based on tactile sensations.

FIG. 21 and FIG. 22 are graphs of experimental results for examining the effect of environment generation based on tactile sensations. FIG. 21 illustrates the results of the answers of the participants to the control target, such as "What space did you wish?". The results illustrated in FIG. 21 indicate that the control targets of the participants were more diverse when the tactile sensation selection device was used than when the language selection device was used.

FIG. 22 is a graph illustrating the answers of the participants to the questions of which selection device "created a room with the desired atmosphere" and "was enjoyable to operate". As illustrated in FIG. 22, it is indicated that when the tactile sensation selection device was used, spaces (rooms) with the participants' desired atmospheres were more reliably created ($p<0.05$) and the selection device was more enjoyable to operate ($p<0.01$) than when the language selection device was used. In addition, there were impressions of the participants who used these selection devices, such as "The tactile sensation selection device made it easier for me to imagine the atmosphere. In the language selection device, some colors or movements did not match my image of the language", "The tactile sensation selection device allowed me to make a more appropriate selection according to the mood without being influenced by the language", "The language selection device seemed to provide a space slightly different from the feeling. The tactile sensation selection device seemed to operate so as to match the space of the room", and "With the language selection device, I had an impression that it was difficult to make the room close to the feeling that I imaged". The data described above indicate that when the tactile sensation selection device is used, spaces (rooms) closer to images that the participants desired for can be achieved than when the language selection device is used.

The test described above indicated that when an individual expresses his/her feeling about an environment, expressing the feeling by selecting a tactile sensation more accurately reflects the sensory orientation that the individual internally has than expressing the feeling in language.

(3-2-4) Description of Tactile Sensation Selection Device and Language Selection Device Used in Experiment Prior to creation of the tactile sensation selection device and the language selection device, a preliminary preparation was made in advance. In the preliminary preparation, the participants were caused to create images corresponding to six types of tactile materials as themes. Thereafter, the images were collected from a plurality of persons, and cluster classification was performed based on the feature quantities of the images to generate images. Accordingly, images in which the six types of tactile materials were implemented in a space were prepared (these images are referred to as tactile cluster images).

An experiment for creating the tactile sensation selection device and the language selection device was performed using the six types of tactile cluster images created in the preliminary preparation. Participants different from those in the preliminary preparation participated in this experiment. First, one of the six types of tactile cluster images was presented on the four surfaces of the room for 10 seconds, and the participants were instructed to view it. After the 10 seconds, the participants were instructed to "select one tactile sensation suitable to express this space (room)" from among the six types of tactile sensations (materials that provide tactile sensations of "downy", "furry", "gritty", "coarse", "silky", and "satiny") in front of the participants, and the participants selected one tactile sensation suitable for the space onto which the image was projected. For provision of the tactile sensations, the tactile materials were provided to the participants in boxes such that the tactile materials were hidden from the participants.

After that, the participants were instructed to "select one word suitable to express this space (room)". The participants selected the most suitable language (emotional word) from among "excited", "bright", "relaxed", "sad", "tense", and "veneration".

Figure 23:
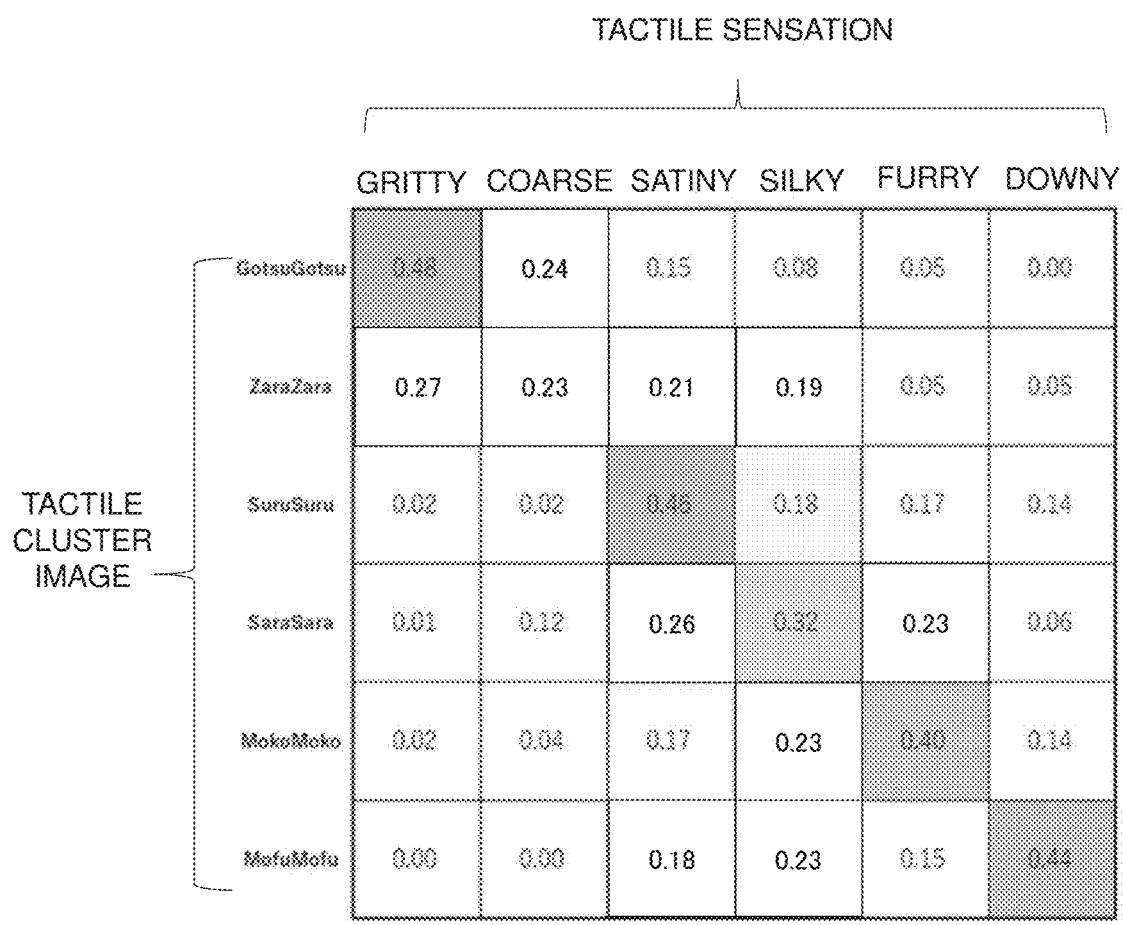
FIG. 23 illustrates a matrix indicating evaluation results of images (environments) automatically generated based on tactile sensations.
Figure 24:
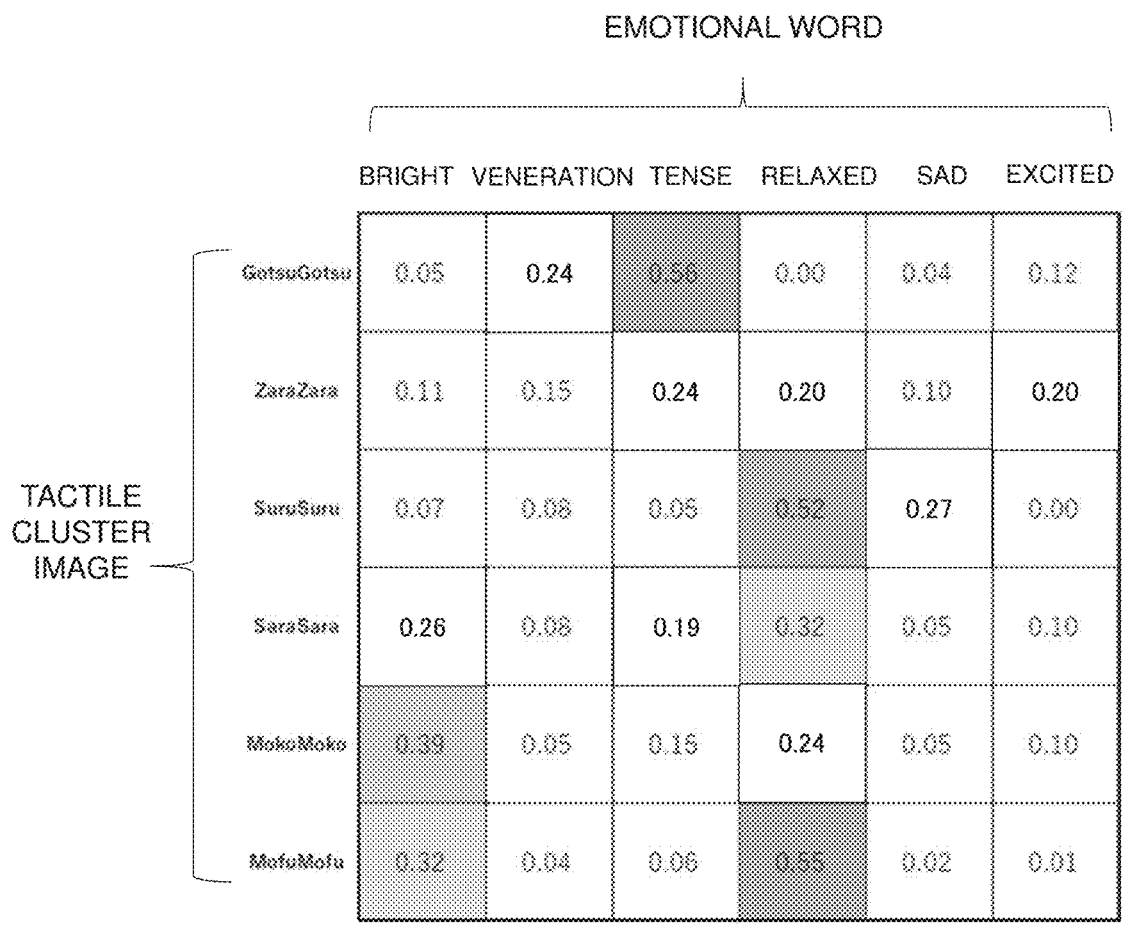
FIG. 24 illustrates a matrix indicating evaluation results of images (environments) automatically generated based on tactile sensations.

FIG. 23 and FIG. 24 illustrate matrices indicating evaluation results of a user for six types of tactile cluster images.

FIG. 23 illustrates a matrix indicating the correlation between the six types of tactile cluster images presented to the participants (corresponding to the vertical axis in FIG. 23) and the tactile sensations evaluated by the participants to be suitable for the space (room) (corresponding to the horizontal axis in FIG. 23). A darker color (larger value) indicates a stronger association (higher correlation) between the tactile cluster image presented to the participants and the tactile sensation evaluated by the participants to be suitable.

FIG. 24 illustrates a matrix indicating the correlation between the six types of tactile cluster images presented to the participants (corresponding to the vertical axis in FIG. 24) and the emotional words evaluated by the participants to be suitable for the space (room) (corresponding to the horizontal axis in FIG. 24). A darker color (larger value) indicates a stronger association (higher correlation) between the tactile cluster image presented to the participants and the emotional word evaluated by the participants to be suitable.

A tactile cluster image was associated with a tactile sensation (tactile material) and emotional word having a high correlation with the tactile sensation to prepare the tactile sensation selection device and the language selection device.

For example, the tactile cluster image "GotsuGotsu (meaning 'gritty')" has a high correlation with the tactile material "gritty". Thus, the tactile sensation selection device was configured to reproduce the tactile cluster image "GotsuGotsu" in the space in response to selection of the material corresponding to "gritty".

For example, the tactile cluster image "GotsuGotsu" has a high correlation with the emotional word "tense". Thus, the language selection device was configured to reproduce the tactile cluster image "GotsuGotsu" in the space in response to selection of the emotional word "tense".

(3-3) Operation

When the user 5 touches one of the touch portions 81*a*, 81*b*, 81*c*, 81*d*, 81*e*, 81*f*, etc. of the tactile sensation selection device 80, the recognition unit 82 senses the touch and recognizes the selected tactile sensation. For example, the recognition unit 82 according to this embodiment analyzes which of the touch portions 81*a*, 81*b*, 81*c*, 81*d*, 81*e*, 81*f*, etc. the user 5 has touched and how the user 5 has touched it on the basis of the number of touches and/or the touch duration or the like of the touch portion touched by the user 5 in the target space S to recognize the tactile sensation corresponding to the state of the environment in the target space S, thereby acquiring information (tactile information) indicating the tactile sensation.

(3-4) Applications

The operation device 85 illustrated in FIG. 18 can be constructed using the analysis result of the tactile sensations by the recognition unit 82. The operation device 85 includes, in addition to the tactile sensation selection device 80, a processing unit 83 implemented by any processor and memory, and a communication unit 84, which is a desired communication interface. The tactile information determined in accordance with the condition of the touch among the plurality of touch portions 81 by the user 5 and other information is transmitted to another device via the desired communication unit 84. The operation device 85 and another device connectable to the operation device 85 operate as part of the environment generation system 1.

Another device connectable to the operation device 85 may be, for example, the environment generation device 10 (as illustrated in FIG. 1 or FIG. 5), and the operation device 85 may function as an operation device of the environment generation device 10. In this case, the processing unit 83 of the operation device 85 determines an environmental condition corresponding to the tactile sensation recognized by the recognition unit 82. Specifically, the processing unit 83 may determine an environmental condition corresponding to the tactile sensation recognized by the recognition unit 82 in accordance with an environmental condition associated with tactile information stored in advance (for example, information stored in a manner similar to that of an environmental condition storage device described below). The determined environmental condition is transmitted to the environment generation device 10 via the communication unit 84 to control the environment generation device 10. As a result, a specific environment is generated in the target space S on the basis of the input tactile sensation.

The functions of the processing unit 83 may be included in the environment generation device 10. In this case, the operation device 85 transmits the tactile information to the environment generation device 10, and the environment generation device 10 determines an environmental condition corresponding to the tactile sensation.

Another device connectable to the operation device 85 may be the control device 20, 20X, or 20Y (as illustrated in FIG. 6, FIG. 9, FIG. 12, FIG. 13, or FIG. 15), and the operation device 85 may transmit the tactile information to the control device 20, 20X, or 20Y.

The tactile sensation selection device 80 may function as part or all of an environment recognition device. Associating the analysis result of the tactile sensation recognized by the recognition unit 82 with the environmental condition enables the determination of the state of an environment in the target space S based on the tactile sensation selected by the user. In this case, the tactile sensation selection device 80 includes the processing unit 83 (FIG. 18) implemented by any processor and memory. The processing unit 83 determines an environmental condition associated with the tactile sensation recognized by the recognition unit 82. This makes it possible to determine the state of the environment in the target space S corresponding to the tactile sensation input by the user. The determined environmental condition is output to the first cluster classification device 50 (FIG. 9 or FIG. 12) and the second cluster classification device 60 (FIG. 13 or FIG. 15) as reaction information via a desired communication interface, for example.

In the tactile sensation selection device 80, the recognition unit 82 may operate as an environmental condition storage device in combination with the functions of the storage unit 54 or 64 of the first cluster classification device 50 or the second cluster classification device 60 described above.

Specifically, the environmental condition storage device includes, for example, the environmental condition acquisition unit 51 or 61 that acquires an environmental condition including at least one of a temperature, humidity, wind, a picture, an image, and a sound, a tactile information acquisition unit (the recognition unit 82) that acquires tactile information, the tactile information being information indicating a tactile sensation, and the storage unit 54 or 64 that stores the tactile information and the environmental condition in association with each other. The environmental condition storage device may further include the providing unit 81 that provides a plurality of tactile sensations.

The environmental condition stored in the environmental condition storage device belongs to, as in the example described above, for example, one or a plurality of clusters characterized based on the tactile information. Each cluster is generated by collecting a plurality of environmental conditions corresponding to tactile information by, for example, causing a plurality of users to create a plurality of environmental conditions, and clustering the collected environmental conditions. Through the clustering, information in which tactile information and environmental conditions are associated with each other is generated. These pieces of information are accumulated in the storage device as a database. When the user selects a predetermined tactile sensation, the database is referred to, and one of the environmental conditions included in the cluster corresponding to the selected tactile sensation is selected as the control target. To associate tactile information with environmental conditions, a label corresponding to the tactile information in the database is determined in advance. For example, for a furry tactile sensation, a language label such as "furry" or "soft feel" may be set, or any label distinguishable from the other clusters, such as a number or a symbol, may be set. As in the example described above, as a method for selecting an environmental condition in a cluster, an environmental condition may be randomly designated or may be selected or changed according to a predetermined priority.

(3-5) Features

The tactile sensation selection device 80 can recognize a tactile sensation on the basis of the touch portion with which the user has touched, and generate an environment on the basis of the recognized tactile sensation. In addition, using the tactile sensation selection device 80 as part or all of the environment recognition device 70, the operation device 85, or the environmental condition storage device makes it possible to recognize the state of the environment in the target space S on the basis of the difference in tactile sensation. Further, the touch portions are formed of different materials, thereby enabling the tactile sensation selection device 80 to recognize the state of the environment in the target space S on the basis of the difference in tactile sensation due to the materials.

(3-6) Other Association Between Tactile Information and Environmental Conditions In the example described above, tactile information and environmental conditions are associated with each other using clustering. However, this is not limiting. For example, the following method may be used.

For example, a plurality of environmental conditions corresponding to tactile information are set in advance by, for example, being determined by the user, and are stored in the storage device as a database. When the user selects a predetermined tactile sensation, the database is referred to, and the average value of the plurality of environmental conditions corresponding to the predetermined tactile sensation is used as the control target. In this case, instead of the average value, the statistically most common environmental condition may be used as the control target.

Alternatively, the storage device may hold a table including a plurality of preset environmental conditions corresponding to tactile information. When the user selects a predetermined tactile sensation, the table is referred to, and one of the environmental conditions associated with the predetermined tactile sensation is selected as the control target.

Tactile information and environmental conditions may be associated with each other in one-to-one correspondence.

(3-7) Modifications of Touch Portions

The touch portions 81 of the tactile sensation selection device 80 may be implemented by the following configuration.

For example, different vibrations may be generated on the touch surfaces of at least two touch portions to allow the user to select a tactile sensation on the basis of the difference in tactile sensation due to the vibrations. For example, a vibration can be generated on the touch surface of a touch portion having a piezoelectric element that converts voltage into force. This enables recognition of the state of the environment in the target space S or generation of an environment.

Different temperatures and/or humidity may be generated on the touch surfaces of at least two touch portions to allow the user to select a tactile sensation on the basis of the difference in tactile sensation due to the temperatures and/or humidity. For example, the temperature can be changed on the touch surface of a touch portion having a Peltier element. This enables recognition of the state of the environment in the target space S or generation of an environment.

Different voltages and/or currents may be generated on the touch surfaces of at least two touch portions to allow the user to select a tactile sensation on the basis of the difference in tactile sensation due to the voltages and/or currents. For example, a touch portion having an electrode that applies voltage can be employed. This enables recognition of the state of the environment in the target space S or generation of an environment.

Different magnetic forces may be generated on the touch surfaces of at least two touch portions to allow the user to select a tactile sensation on the basis of the difference in tactile sensation due to the magnetic forces. For example, at least two touch portions may be configured such that, for example, movement of magnetic powder contained in a member generates different magnetic forces on the touch surfaces. Alternatively, a touch portion having a magnetic field generation device or a magnetic elastomer whose rigidity changes in accordance with an external magnetic field can be employed. The touch portions 81 may have any combination of the configurations described above. This enables recognition of the state of the environment in the target space S or generation of an environment.

In the examples described above, a single touch portion may be used. For example, changing the temperature and/or humidity, voltage and/or current, or magnetic force on the touch surface of a single touch portion may allow the user to select a tactile sensation that is close to his/her sensation.

(4) Input Assistance Device (Control of Environment Generation Device)

A means by which the user can express that they are "in the mood to receive such an environment" by creating the environment would be able to generate an environment that is closer to the user's sensation. This requires a design in which an environment created by the user is constantly saved in a network-shared database and used to acquire a new generative model. However, it is not practical to implement a system that requires general users with little expertise to create a complex environment from the beginning. Accordingly, the following means is conceivable as a means for creating an environment after setting a common environment protocol. A wide range of types are conceivable, examples of which include a full-scale builder application on a computer, which is capable of creating an environment very precisely, a simplified GUI version thereof on a touch panel, which can be operated even by a child or an elderly person, and a tactile sensation selection device capable of generating an environment unconsciously by touching intuitively. Preparing such means for generating an environment makes it possible to reduce the barriers to entry for users into creative activities to a minimum. An ecosystem in which diverse users share generative model groups via a network may be built to attempt to increase the number of generative models in a sustainable manner. Ideally, it is desirable that the user create a new environment in the ecosystem without being aware that the user is performing their creative activity, and that a new environment be mechanically drawn up and stored in a database. In this way, the user is in contact with a new type of environment created by an unknown person, thereby helping activate creativity that the user potentially has. Building an ecosystem with a high degree of openness in which a chain of serendipity is generated such that the seeds of new creation are developed successively makes it possible to continue to acquire new generative models in a sustainable manner.

In view of the above, an example will be described for an input assistance device having an interface that enables intuitive operation when the terminal device 30 described above inputs an environmental condition to the control device 20X or 20Y. The input assistance device may be implemented by a program installed into the terminal device 30. Examples of the interface that enables intuitive operation will be given below.

(4-1) First Example

In a first example, an input assistance device is configured to be capable of determining an environmental condition for moving a predetermined display object across the wall surface of the target space S via a projector that constitutes the environment generation device 10. For example, in response to the user 5 operating the terminal device 30, the environment generation device 10 displays a display object R on the wall surface of the target space S (see FIG. 1 or 5). The terminal device 30 has installed therein the function of the input assistance device and is configured to receive adjustment information for adjusting the number of points of the display object R, the moving direction, moving speed, size, color, shape, and arrangement of the points, and the periodic motion and the like of the points. Accordingly, the user 5 inputs the adjustment information to the terminal device (input assistance device) 30, thereby being able to change the display style of the display object R displayed on the wall surface of the target space S.

It is considered that when the display object R moves upward, a more positive impression is given to people than when the display object R moves downward. It is also considered that when the display object R moves to the right, a more positive impression is given to people than when the display object R moves to the left.

The terminal device 30 may include the tactile sensation selection device 80. In this case, as described above, the parameters for the environmental conditions can be changed in accordance with the conditions of touch of the plurality of touch portions 81 of the tactile sensation selection device 80 by the user 5. The conditions of the touch include, for example, which surface of the touch portions 81 the user 5 has touched, the strength with which the user 5 has touched the surface, the orientation of the surface with which the user 5 has touched, and the frequency with which the user 5 has touched. On the basis of the conditions of the touch, the parameters for the environmental conditions can be changed to change the number of points of the display object R, the moving direction, size, color, shape, and arrangement of the points, and the periodic motion and the like of the points.

(4-2) Second Example (4-2-1) Screen Interface In a second example, an input assistance device is configured to be capable of moving a predetermined display object across the screen and determining an environmental condition in response to the movement of the display object. The input assistance device is also configured to be capable of controlling the environment generation device 10 under the determined environmental condition.

Figure 19:
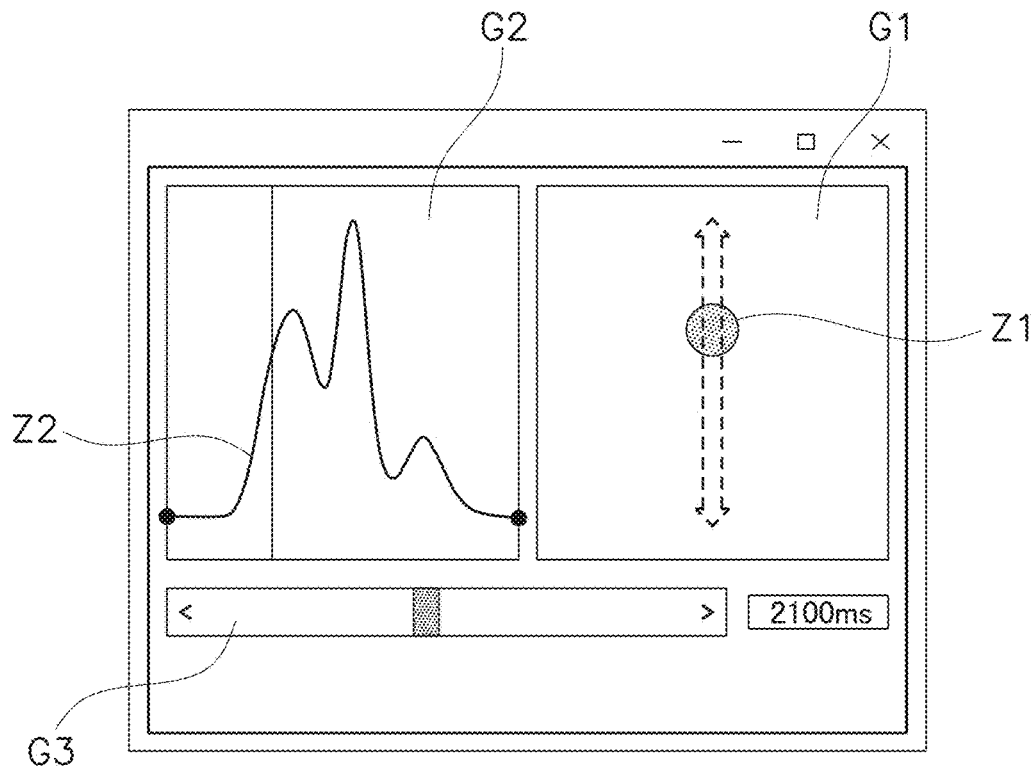
FIG. 19 is a schematic diagram illustrating an example of an interface of an input assistance device.

For example, the input assistance device has an interface having a configuration illustrated in FIG. 19. Here, a round display object Z1 is displayed in a right region G1 of the screen of the input assistance device. In this interface, when the user 5 draws a curved line Z2 using a mouse, a touch screen, or the like in a left region G2 of the screen illustrated in FIG. 19, the round display object Z1 displayed in the right region G1 moves up and down with one degree of freedom for a predetermined time in accordance with the curved line Z2. In the left region G2 illustrated in FIG. 19, the vertical axis indicates the up and down movement, and the horizontal axis indicates time. Further, changing the length of a scroll bar G3 in a lower portion can change the time during which the round display object Z1 moves, whenever necessary. This interface enables anyone to intuitively create various movements. As a result, the use of the input assistance device using such an interface makes it possible to extract and generate environmental conditions that reflect the sensations shared by a group of people.

(4-2-2) Experimental Example

The classification of environmental conditions using the input assistance device will be additionally described with reference to an experimental example.

In this experiment, each of 53 adult participants was instructed to create curved lines to freely express five movements, including "P1: a happy creature movement", "P2: a sad creature movement", "P3: a relaxed creature movement", "P4: a tense creature movement", and "P5: an abiotic movement", with curved lines by using the input assistance device without any preconceptions.

Figure 20:
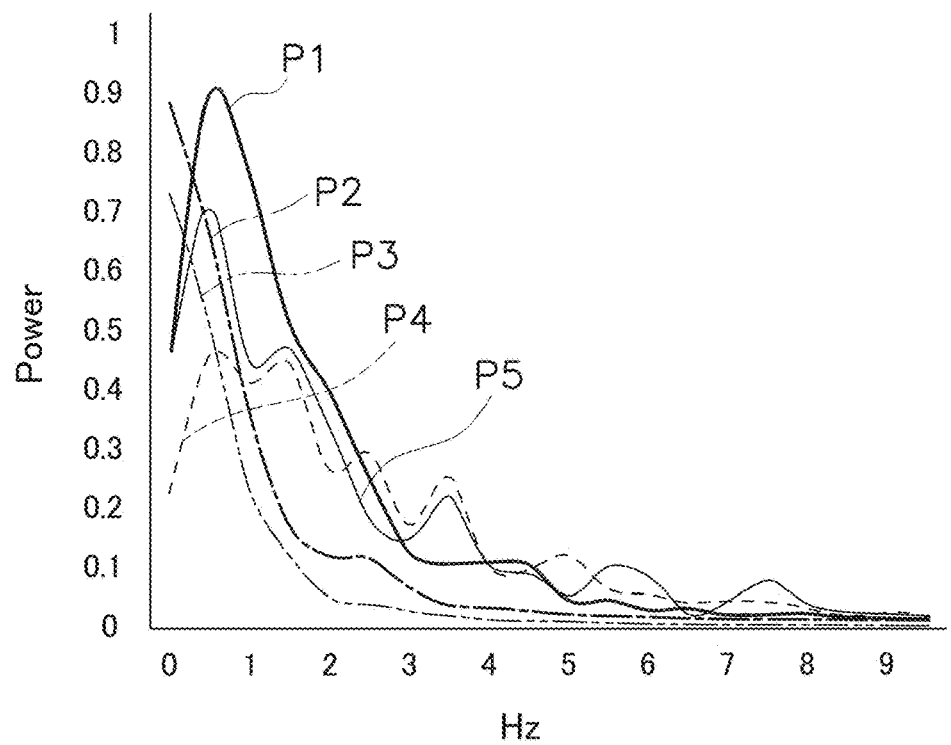
FIG. 20 is a diagram illustrating results of an experiment performed using the input assistance device.

Then, the curved lines created by each participant by imaging the five movements were considered as waveforms and were individually subjected to a Fourier transform. The average power spectrum of the 53 participants for each type of movement was determined, and results illustrated in FIG. 20 were obtained. As can be seen from the results, although each participant freely designed movements corresponding to predetermined images without any preconceptions, features common to the participants for each type of movement were observed on the power spectrum. This suggests that while many participants perform intuitive design, a sensory orientation shared among individuals can be extracted.

Accordingly, the use of an input assistance device having an intuitive interface as described above facilitates the setting of clusters of environmental conditions for generating an environment that reflects the sensory orientation shared among individuals.

OTHER EMBODIMENTS

While embodiments have been described, it will be understood that various changes in form and details may be made without departing from the spirit and scope of the claims.

The present disclosure is not limited directly to the embodiments described above. The present disclosure can be embodied by modifying the constituent elements without departing from the gist thereof in the implementation stage. In addition, the present disclosure can form various disclosures by appropriately combining a plurality of constituent elements disclosed in each of the embodiments described above. For example, some constituent elements may be deleted from the constituent elements given in the embodiment. Furthermore, constituent elements may be appropriately combined in a different embodiment.

What is claimed is:

1. An environmental condition storage device for storing an environmental condition of a target space, the environmental condition storage device comprising:
an environmental condition acquisition unit configured to acquire the environmental condition of the target space, the environmental condition including at least one of a temperature, humidity, wind, a picture, an image, and a sound in the target space;

a tactile information acquisition unit configured to acquire tactile information indicating a tactile sensation of a user present in the target space, the tactile information acquisition unit including a processor and a memory; and a storage unit that stores the environmental condition and the tactile information in association with each other.

2. The environmental condition storage device according to claim 1, further comprising:

a providing unit that provides a plurality of tactile sensations, the tactile information acquisition unit being configured to recognize a tactile sensation selected by the user from the plurality of tactile sensations to acquire the tactile information, the tactile information being information indicating the selected tactile sensation.

3. The environmental condition storage device according to claim 2, wherein the tactile information acquisition unit is further configured to recognize a tactile sensation selected by the user based on at least one of a number of touches for the tactile sensations provided by the providing unit and a touch duration for the tactile sensations provided by the providing unit.

4. An environmental condition storage method for storing an environmental condition of a target space, the environmental condition storage method comprising:

acquiring the environmental condition of the target space, the environmental condition including at least one of a temperature, humidity, wind, a picture, an image, and a sound;

acquiring tactile information indicating a tactile sensation of a user present in the target space; and storing in a storage unit the environmental condition and the tactile information in association with each other.

5. The environmental condition storage method according to claim 4, further comprising:

after providing tactile sensations, recognizing a tactile sensation selected by the user, the acquiring the environmental condition includes recognizing the tactile sensation selected by the user to acquire the tactile information indicating the selected tactile sensation.

6. The environmental condition storage method according to claim 5, wherein the recognizing the tactile sensation includes recognizing the tactile sensation selected by the user based on at least one of a number of touches and a touch duration for the provided tactile sensations.

7. An operation device for operating an environment generation device that generates a specific environment in a target space in accordance with an environmental condition of the target space, the operation device comprising:

a providing unit having one or more touch surfaces, the providing unit being configured to provide a plurality of tactile sensations;

a recognition unit configured to recognize a tactile sensation selected from the plurality of tactile sensations by a user present in the target space, the recognition unit including a processor and a memory;

a processing unit configured to determine the environmental condition based on the tactile sensation recognized by the recognition unit, the processing unit including a processor and a memory; and a communication unit configured to transmit the environmental condition determined by the processing unit to the environment generation device.

8. The operation device according to claim 7, wherein the recognition unit is further configured to recognize the tactile sensation selected by the user based on at least one of a number of touches for the tactile sensations provided by the providing unit and a touch duration for the tactile sensations provided by the providing unit.

9. The operation device according to claim 7, wherein the providing unit has the one or more touch surfaces made of different materials.

10. The operation device according to claim 7, wherein the providing unit is further configured to generate vibrations on the one or more touch surfaces to provide a plurality of different tactile sensations.

11. The operation device according to claim 7, wherein the providing unit is further configured to control a temperature or humidity of the one or more touch surfaces to provide a plurality of different tactile sensations.

12. The operation device according to claim 7, wherein the providing unit is further configured to generate a voltage or a current on the one or more touch surfaces to provide a plurality of different tactile sensations.

13. The operation device according to claim 7, wherein the providing unit is further configured to generate a magnetic force on the one or more touch surfaces to provide a plurality of different tactile sensations.

14. An operation method for operating an environment generation device that generates a specific environment in a target space in accordance with an environmental condition of the target space, the operation method comprising:

after providing tactile sensations, recognizing a tactile sensation selected by a user present in the target space;

determining the environmental condition based on the recognized tactile sensation; and transmitting the determined environmental condition to the environment generation device.

15. The operation method according to claim 14, wherein the recognizing the tactile sensation selected by the user includes recognizing the tactile sensation selected by the user based on at least one of a number of touches for the tactile sensations provided by a providing unit and a touch duration for the tactile sensations provided by the providing unit.

16. An environment recognition device comprising:

a providing unit having one or more touch surfaces, the providing unit being configured to provide a plurality of tactile sensations;

a recognition unit configured to recognize a tactile sensation selected from the plurality of tactile sensations by a user present in a target space, the recognition unit including a processor and a memory; and a processing unit configured to determine an environmental condition of the target space corresponding to the tactile sensation recognized by the recognition unit, the processing unit including a processor and a memory.

17. The environment recognition device according to claim 16, wherein
the recognition unit is further configured to recognize the tactile sensation selected by the user based on at least one of
a number of touches for the tactile sensations provided by the providing unit and
a touch duration for the tactile sensations provided by the providing unit.

18. The operation device according to claim 8, wherein the providing unit has the one or more touch surfaces made of different materials.

19. The operation device according to claim 8, wherein the providing unit is further configured to generate vibrations on the one or more touch surfaces to provide a plurality of different tactile sensations.

20. The operation device according to claim 8, wherein the providing unit is further configured to control a temperature or humidity of the one or more touch surfaces to provide a plurality of different tactile sensations.

21. The environmental condition storage device according to claim 1, wherein
the environmental condition of the target space includes at least two of the temperature, the humidity, the wind, the picture, the image, and the sound.

22. The environmental condition storage device according to claim 1, further comprising:
a providing unit having a plurality of touch surfaces, the providing unit being configured to provide a plurality of tactile sensations that are selectable by being touched by the user,
the tactile information acquisition unit being arranged to communicate with the providing unit and configured to acquire tactile information indicating the tactile sensation selected by the user.

23. The environmental condition storage device according to claim 22, wherein
the plurality of touch surfaces are made of different materials and constitute outwardly facing surfaces of the providing unit.

24. The environmental condition storage device according to claim 22, wherein
the plurality of touch surfaces include at least two touch surfaces having different strengths for same the tactile sensation.

* * * * *